US012710840B2

(12) United States Patent
Portmann et al.

(10) Patent No.: US 12,710,840 B2
(45) Date of Patent: Aug. 18, 2026

(54) MEASURING PHASORS OF PHASE QUADRATURE SIGNALS FOR CAPACITIVE SENSING

(71) Applicant: Microchip Touch Solutions Limited, Wokingham (GB)

(72) Inventors: Lionel Portmann, Vaud (CH); Axel Heim, Munich (DE); Ruben Fontes, Vaud (CH); Claus Kaltner, Munich (DE); Paul Clements, Meonstoke (GB); Richard P. Collins, Southampton (GB); Paul Heslop, Eastleigh (GB); John Dubery, Basingstoke (GB); Nikhil Madgar, Munich (DE)

(73) Assignee: Microchip Touch Solutions Limited, Wokingham (GB)

( * ) Notice: Subject to any disclaimer, the term of this patent is extended or adjusted under 35 U.S.C. 154(b) by 206 days.

(21) Appl. No.: 18/816,165

(22) Filed: Aug. 27, 2024

(65) Prior Publication Data

US 2025/0271963 A1 Aug. 28, 2025

Related U.S. Application Data

(60) Provisional application No. 63/556,725, filed on Feb. 22, 2024.

(51) Int. Cl.
*G06F 3/041* (2006.01)
*G01D 5/24* (2006.01)
*G06F 3/044* (2006.01)

(52) U.S. Cl.
CPC ....... *G06F 3/04166* (2019.05); *G01D 5/2405* (2013.01); *G06F 3/0446* (2019.05)

(58) Field of Classification Search
CPC .. G06F 3/04166; G06F 3/0446; G01D 5/2405
(Continued)

(56) References Cited

U.S. PATENT DOCUMENTS 9,235,380 B2 * 1/2016 Trent ........................ G06F 8/20
10,877,608 B2 12/2020 Vix et al.
(Continued)

FOREIGN PATENT DOCUMENTS

EP 3800534 A1 4/2021 ............. G06F 3/041
WO 2018/004827 A2 1/2018 ............. G06F 3/041

OTHER PUBLICATIONS

International Search Report and Written Opinion, Application No. PCT/EP2024/074218, 15 pages, Jan. 24, 2025.

*Primary Examiner* — Arleen M Vazquez
*Assistant Examiner* — Robert P Alejnikov, Jr.
(74) *Attorney, Agent, or Firm* — SLAYDEN GRUBERT BEARD PLLC

(57) ABSTRACT

Methods and systems for capacitive sensing provide first and second transmit electrodes and a receive electrode positioned to have mutual capacitances between the first and second transmit electrodes and the receive electrode at mutual capacitance nodes, wherein the mutual capacitance at respective ones of mutual capacitance nodes changes when an interfering object is proximate, to apply simultaneously a first drive signal to the first transmit electrode and a second drive signal to the second transmit electrode, wherein the first and second drive signals are in quadrature with each other; to receive a receive signal via the receive electrode; measure a phasor of the receive signal; and identify a change in mutual capacitance based on the phasor of the receive signal.

20 Claims, 20 Drawing Sheets

(58) Field of Classification Search
USPC .......................................................... 324/679
See application file for complete search history.

(56) References Cited

U.S. PATENT DOCUMENTS

| | | | | |
|---|---|---|---|---|
| 2013/0162585 | A1* | 6/2013 | Schwartz | G06F 3/0446<br>345/174 |
| 2017/0364184 | A1* | 12/2017 | Weinerth | G06F 3/0446 |
| 2018/0364861 | A1* | 12/2018 | Gray | G06F 3/04166 |
| 2019/0056823 | A1* | 2/2019 | Stevenson | G06F 3/0443 |
| 2019/0101999 | A1* | 4/2019 | Amer | G06F 3/0446 |
| 2019/0391682 | A1* | 12/2019 | Vix | G06F 3/04166 |
| 2020/0233531 | A1* | 7/2020 | Weinerth | G06F 3/0442 |
| 2023/0100570 | A1* | 3/2023 | Sadeghipour | G06F 3/0418 |
| 2024/0074218 | A1* | 2/2024 | Forrest | B82Y 10/00 |

* cited by examiner $$Hn = \begin{bmatrix} 1 & j & 1 & j \\ 1 & -j & 1 & -j \\ 1 & j & -1 & -j \\ 1 & -j & -1 & j \\ j & -1 & j & -1 \\ j & 1 & j & 1 \\ j & -1 & -j & 1 \\ j & 1 & -j & -1 \end{bmatrix}$$

TWO ORTHOGONAL WAVEFORMS

TX WAVEFORM 0 0.2 0.4 0.6 0.8 1

TIME

MEASURING PHASORS OF PHASE QUADRATURE SIGNALS FOR CAPACITIVE SENSING

PRIORITY STATEMENT

This application claims priority to U.S. Provisional Patent Application No. 63/556,725, filed Feb. 22, 2024, the contents of which are hereby incorporated in their entirety.

TECHNICAL FIELD

The present disclosure relates to methods of scanning touch screen electrodes, in particular, methods of an electrode while distinguishing mutual capacitances.

BACKGROUND

A two-dimensional touchscreen is formed by electrodes used as transmitters (X) and electrodes used as receivers (Y), arranged in rows and columns. This forms a matrix of mutual capacitances associated with the nodes between X and Y electrodes. Measuring this matrix is challenging because each Y receiver electrode forms nodes with all the X transmitter electrodes, yet individual nodes must be distinctly measured.

Two scan methods are commonly used: time division multiple access (TDMA), and code division multiple access (CDMA).

TDMA applies a stimulus to one X electrode at a time while the other X electrodes remain grounded during a respective time interval called a "chip." All receiver electrodes convert their signal into streams of samples based on the respective transmitting time interval. The mutual capacitances are deduced from the signals of the respective chip time intervals. Because there is one active transmitter at a time, individual nodes are distinctly measured. Fully scanning the screen requires a number of chip time intervals equal to the number of X electrodes.

With CDMA, multiple X electrodes are driven simultaneously during one chip, but some are driven by a waveform inverse of the other electrodes (inverse polarity or phase rotation of 180°). At first, the received signal is effectively an indistinguishable combination of signals from all nodes. However, if over multiple chips the distribution of which X electrodes use positive polarity and which use negative polarity is changed according to patterns found in orthogonal matrices (field of mathematics), then the received data can be decoded, and the mutual capacitances of all nodes distinguished.

CDMA offers better signal to noise ratio (SNR) compared to TDMA, however, the number of chips required to scan the whole screen still equals the number of X electrodes. Other methods known as orthogonal frequencies division (OFDM) are rarely used because of EMI or EMC constraints.

Generally, in transmission schemes using spread-spectrum techniques like, for example, Code-Division Multiple-Access (CDMA) or Code-Division Multiplexing (CDM), the transmitted information can be decoded at the receiver after the entire transmitted sequence has been received. In CDMA, signals of two transmitters received by a single receiver may be deduced where the transmitters drive two transmit electrodes with inverse polarity (phase 0° or 180°). For some applications, however, it can be of interest to obtain an estimate (of the transmitted information, or complex channel gain) beforehand, even if at the expense of reduced signal-to-noise ratio (SNR) or estimation accuracy. One group of such applications, for example, are sensor applications which require a certain output report rate.

There is a need for a method of efficiently scanning mutual capacitances without sacrificing signal-to-noise ratio or interference estimation accuracy.

SUMMARY

According to aspects, transmitters simultaneously drive electrodes with a choice of four phases, 0°, 90°, 180° and 270° and the receiver measures a phasor (amplitude and phase information) to double the number of TX electrodes driven at a time while the touch estimation accuracy the SNR are maintained—the method is called quadrature modulation (QM).

According to aspects, there is provided a method comprising: providing a capacitive sensing system comprising first and second transmit electrodes and a receive electrode positioned to have mutual capacitances between the first and second transmit electrodes and the receive electrode at mutual capacitance nodes, wherein the mutual capacitance at respective ones of the mutual capacitance nodes changes when an interfering object is proximate; applying simultaneously a first drive signal to the first transmit electrode and a second drive signal to the second transmit electrode, wherein the first and second drive signals are in quadrature with each other; receiving a receive signal via the receive electrode; measuring a phasor of the receive signal; and identifying a change in mutual capacitance based on the phasor of the receive signal.

An aspect according to the preceding paragraph, the method wherein the providing the capacitive sensing system comprises providing third and fourth transmit electrodes, wherein the receive electrode is positioned to have mutual capacitances between the first, second, third, and fourth transmit electrodes at mutual capacitance nodes, wherein the mutual capacitance at respective ones of mutual capacitance nodes changes when an interfering object is proximate; the method comprising: applying simultaneously a third drive signal to the third transmit electrode and a fourth drive signal to the fourth transmit electrode, wherein the third and fourth drive signals are in quadrature with each other.

An aspect according to one of the preceding two paragraphs, a method comprising identifying a mutual capacitance node proximate an interfering object based on the phasor of the receive signal.

An aspect according to one of the preceding three paragraphs, comprising: applying during a first chip first, second, third, and fourth drive signals to the first, second, third, and fourth transmit electrodes, respectively, wherein the first and second drive signals are in quadrature with each other, wherein the third and fourth drive signals are in quadrature with each other, wherein the third drive signal has inverse polarity relative to the first drive signal, and wherein the fourth drive signal has inverse polarity relative to the second drive signal; receiving a first receive signal from the receive electrode corresponding to the first chip; measuring a first phasor from the first receive signal; applying during a second chip fifth, sixth, seventh, and eighth drive signals to the first, second, third, and fourth transmit electrodes, respectively, wherein the fifth and sixth drive signals are in quadrature with each other, wherein the seventh and eighth drive signals are in quadrature with each other, wherein the seventh drive signal is in-phase relative to the fifth drive signal, and wherein the eighth drive signal is in-phase relative to the sixth drive signal; receiving a second receive signal from the receive electrode corresponding to the second chip; measuring a second phasor from the second receive signal; performing an operation on the first and second phasors; and identifying a change in a mutual capacitance based on a result of a performed operation on the first and second phasors.

An aspect according to one of the preceding four paragraphs, a method comprising identifying a mutual capacitance node proximate an interfering object based on a result of a performed operation on the first and second phasors.

An aspect according to one of the preceding five paragraphs, wherein the first and second drive signals comprise a wave selected from sinusoidal, square, and impulse.

An aspect according to one of the preceding six paragraphs, wherein the first and second drive signals comprise waves varied over time by a characteristic, wherein the characteristic is selected from amplitude and frequency.

According to an aspect, there is provided a system comprising: a capacitive sensing system comprising first and second transmit electrodes and a receive electrode positioned to have mutual capacitances between the transmit electrodes and the receive electrode at mutual capacitance nodes, wherein the mutual capacitance at respective ones of mutual capacitance nodes changes when an interfering object is proximate; a drive signal generator circuit operatively coupled to the first and second transmit electrodes; a receive signal receiver circuit operatively coupled to the receiver electrode; a logic circuit operatively coupled to the drive signal generator circuit and the receive signal receiver circuit, the logic circuit to: apply simultaneously a first drive signal to the first transmit electrode and a second drive signal to the second transmit electrode, wherein the first and second drive signals are in quadrature with each other; receive a receive signal via the receive electrode; measure a phasor of the receive signal; and identify a change in mutual capacitance based on the phasor of the receive signal.

An aspect according to the preceding paragraph, comprising third and fourth transmit electrodes, wherein receive electrode is positioned to have mutual capacitances between the first, second, third, and fourth transmit electrodes at mutual capacitance nodes, wherein the mutual capacitance at respective ones of mutual capacitance nodes changes when an interfering object is proximate; the logic circuit to: apply simultaneously a third drive signal to the third transmit electrode and a fourth drive signal to the fourth transmit electrode, wherein the third and fourth drive signals are in quadrature with each other.

An aspect according to one of the preceding two paragraphs, wherein the logic circuit is to identify a mutual capacitance node proximate an interfering object based on the phasor of the receive signal.

An aspect according to one of the preceding three paragraphs, wherein the logic circuit is to: apply during a first chip first, second, third, and fourth drive signals to the first, second, third, and fourth transmit electrodes, respectively, wherein the first and second drive signals are in quadrature with each other, wherein the third and fourth drive signals are in quadrature with each other, wherein the third drive signal has inverse polarity relative to the first drive signal, and wherein the fourth drive signal has inverse polarity relative to the second drive signal; receive a first receive signal from the receive electrode corresponding to the first chip; measure a first phasor from the first receive signal; apply during a second chip fifth, sixth, seventh, and eighth drive signals to the first, second, third, and fourth transmit electrodes, respectively, wherein the fifth and sixth drive signals are in quadrature with each other, wherein the seventh and eighth drive signals are in quadrature with each other, wherein the seventh drive signal is in-phase relative to the fifth drive signal, and wherein the eighth drive signal is in-phase relative to the sixth drive signal; receive a second receive signal from the receive electrode corresponding to the second chip; measure a second phasor from the second receive signal; perform an operation on the first and second phasors; and identify a change in a mutual capacitance based on a performed operation on the first and second phasors.

An aspect according to one of the preceding four paragraphs, wherein the logic circuit is to identify a mutual capacitance node proximate an interfering object based on a performed operation on the first and second phasors.

An aspect according to one of the preceding five paragraphs, wherein the first and second drive signals comprise a wave selected from sinusoidal, square, and impulse.

An aspect according to one of the preceding six paragraphs, wherein the first and second drive signals comprise waves varied over time by a characteristic, wherein the characteristic is selected from amplitude and frequency.

According to an aspect, there is provided a method comprising: providing a capacitive sensing system comprising first and second transmit electrodes and a receive electrode positioned to have mutual capacitances between the transmit electrodes and the receive electrode at mutual capacitance nodes, wherein the mutual capacitance at respective ones of mutual capacitance nodes changes when an interfering object is proximate; applying simultaneously an in-phase drive signal to the first transmit electrode and a quadrature drive signal to the second transmit electrode; receiving a receive signal via the receive electrode; measuring a phasor of the receive signal; and decoding the phasor via a quadrature phase shift key to identify a change in mutual capacitance.

An aspect according to the preceding paragraph, wherein the providing a capacitive sensing system comprises providing third and fourth transmit electrodes, wherein the receive electrode is positioned to have mutual capacitances between the first, second, third, and fourth transmit electrodes at mutual capacitance nodes, wherein the mutual capacitance at respective ones of mutual capacitance nodes changes when an interfering object is proximate; the method comprising: applying simultaneously an in-phase drive signal to the first transmit electrode, a quadrature drive signal to the second transmit electrode, an in-phase drive signal to the third transmit electrode, and a quadrature drive signal to the fourth transmit electrode.

An aspect according to one of the preceding two paragraphs, comprising identifying a mutual capacitance node proximate an interfering object based on decoding the phasor via a quadrature phase shift key.

An aspect according to one of the preceding three paragraphs, comprising: applying during a first chip an in-phase drive signal to the first transmit electrode, a quadrature drive signal to the second transmit electrode, an inverse polarity to in-phase drive signal to the third transmit electrode, and an inverse polarity to quadrature drive signal to the fourth transmit electrode; receiving a first receive signal from the receive electrode corresponding to the first chip; measuring a first phasor from the first receive signal; applying during a second chip an in-phase drive signal to the first transmit electrode, a quadrature drive signal to the second transmit electrode, an in-phase drive signal to the third transmit electrode, and a quadrature drive signal to the fourth transmit electrode; receiving a second receive signal from the receive electrode corresponding to the second chip; measuring a second phasor from the second receive signal; decoding the first and second phasors via a code division multiple access operation to identify a change in mutual capacitance.

An aspect according to one of the preceding four paragraphs, wherein the first and second drive signals comprise a wave selected from sinusoidal, square, and impulse.

An aspect according to one of the preceding five paragraphs, wherein the first and second drive signals comprise waves varied over time by a characteristic, wherein the characteristic is selected from amplitude and frequency.

BRIEF DESCRIPTION OF THE DRAWINGS

The figures illustrate examples of a set of parallel transmitter electrodes and a set of parallel receiver electrodes positioned orthogonal to the transmitter electrodes in a two-dimensional (x,y) plane, each transmitter electrode of the set of parallel transmitter electrodes is assigned a code word from a set of orthogonal code words so as to measure phasors of phase quadrature signals at the receiver electrodes.

FIG. 2B shows a phasor measured by the system of FIG. 2A when there are interferences of both the first and second mutual capacitances where two transmit electrodes form mutual capacitance nodes with a receive electrode.

Figure 1:
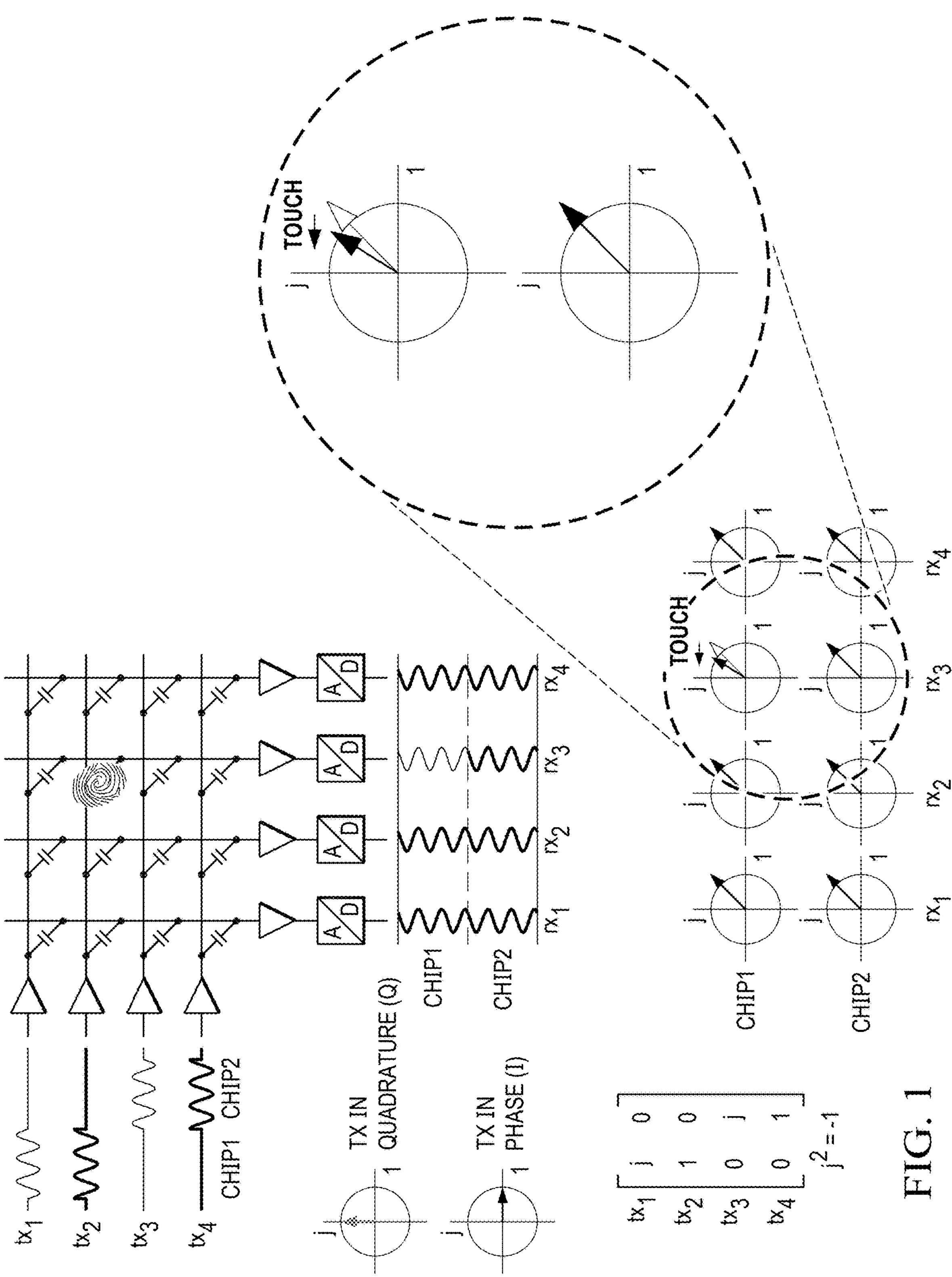
FIG. 1 shows a quadrature TX superposition wherein two pairs of TX transmitters are 90° phase rotated so that amplitude and phase may be measured to unambiguously identify interference at mutual capacitance nodes.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to aspects, utilizing quadrature modulation (QM), two transmit (X) electrodes are simultaneously driven and the two mutual capacitances are distinguished. Unlike CMDA, the method does not rely on multiple chips and sequences of phase changes. In QM, these two transmit (X) electrodes are driven in phase quadrature (phase rotation of 90°) and the receiver computes the phasor (both amplitude and phase information) of the received signal. A change of mutual capacitance at one of the mutual capacitance nodes causes a deviation of the received phasor in a first direction, whereas a change of mutual capacitance at the second mutual capacitance node causes a deviation in a second direction, which second direction is orthogonal to the first direction. With appropriate geometrical projections of the phasor change, the two mutual capacitances are unambiguously measured. In some aspects, this quadrature modulation scheme (based on a 90° phase shift) may be combined with CDMA (based on 180° phase shifts). This combined system (QM+CDMA=QCDMA) drives multiple X transmitter electrodes simultaneously with, from one chip to another chip, patterns of phase changes between 0, 90, 180 or 270 degrees.

A "phasor" is a scalar complex number, i.e., it can be considered as one vector in a two-dimensional (2D) plane. Amplitude of a phasor means the complex number's absolute value, and phase of a phasor means the complex number's phase. A phase "shift" may be relative to a reference. A "phasor" is an absolute phase, i.e., relative to a phase 0.

As used herein, two transmit electrodes are said to be driven "in quadrature" when the transmit signal driving one transmit electrode is phase shifted relative to the transmit signal driving the other transmit electrode, wherein the phase shift is sufficiently orthogonal (+/−90 degrees) to allow the receiver to compute the phasor (both amplitude and phase information) of the received signal so that the two mutual capacitances may be unambiguously measured. The term "quadrature modulation (QM)" means the relative phase shift between the transmit signal applied to two transmit electrodes, for example 90 degrees. The relative phase shift may be sufficient to allow the receiver to compute the phasor (both amplitude and phase information) of the received signal so that the two mutual capacitances may be unambiguously measured, wherein the relative phase shift may be 90 degrees, 85-95 degrees, or 80-100 degrees.

A "phase drive signal" is a signal applied to a first transmit electrode and a "quadrature drive signal" is a signal simultaneously applied to a second transmit electrode, wherein the signals are "in quadrature."

Suitable stimulus waveforms may include: sinusoidal (sine and cosine), square waves, impulses. The frequency of the stimulus can be varied. In this context, for periodic waveforms the frequency refers to the inverse of the waveform's period which is a time. For non-periodic waveforms there is still a notion of instantaneous frequency. One example is to change the length of a chip while keeping the number of periods within the chip unchanged. Optionally an envelope may be applied to the waveforms to reduce emissions.

Received phasors (both amplitude and phase information) may be efficiently computed with coherent correlators. CORDIC algorithms may efficiently produce the correlators templates, including envelopes for more effective out of band noise rejection.

According to aspects, CDMA signals may be decoded by measuring phasors, and post processing of the phasors may provide for projections and baselines of the CDMA signals. For context, conventional CDMA decoding works by converting each measure chip into one scalar number, collect the measurements over multiple chips into a vector, correlate this vector with the possible CDMA codes. The latter step—the actual decoding—means some elements of the vector are multiplied by minus one and then the vector is summed into one scalar. With QM, a chip is measured as a phasor (a two-dimensional vector), so that the resulting measurement of multiple chips becomes a vector of phasors. Then the decoding comprises multiplying elements of the vector by minus one. In particular, in QM the elements are phasors instead of scalars.

For the same amount of time allotted to scan a touchscreen, aspects may improve signal-to-noise ratio (SNR) by 3 dB (½ of the noise power) compared to CDMA without QM. Conversely, for the same SNR, the time to scan a touchscreen may be half compared to CDMA without QM. Implementation of aspects in a microchip may not require an appreciable increase in the required memory or the number of mathematical operations compared to CDMA without QM. Aspects of the receiver digital processing may be well suited for sigma delta analog-to-digital conversion (ADC).

Synchronized transmitters and receivers may share a common "carrier frequency." This frequency may vary over time following an "instantaneous carrier frequency function" Fc(t). The signal of receive electrodes may be conditioned by an AFE (analog front end) and then digitized by an analog to digital converter ADC at a rate fs (sampling rate) into a stream of samples. A "chip" is the time interval over which a receiver measures the received signal. During a chip, the receiver estimates the spectral component of the signal matching the instantaneous carrier frequency fc=Fc(t) and computes the amplitude and phase of this component, as described herein. The influence of noises elsewhere in the spectrum is attenuated. Several digital signal processing (DSP) techniques can be used for extracting a phasor and attenuating other noises: e.g., a coherent homodyne receiver, a correlator, or curve fitting algorithms.

QM may be used to compute either in advance or in real time the transmit signal and either: a) the receiver filters coefficients; b) the correlator templates; or c) the local oscillator (LO) waveforms of a coherent homodyne receiver.

These different implementations produce a similar result: a phasor of the received signal during a chip duration. Starting from a function which describes the carrier frequency over time Fc(t), one computes IFc(t), the integral of Fc(t) over time, which is, when multiplied with the factor 2pi, the instantaneous phase of the carrier. Whether one uses an indefinite integral or a definite integral may not be important because it amounts to a phase offset shared by all TX and RX signals, which is called phi0. Stem functions are created and grouped. The transmit waveforms can be produced with one or more D/A converters fed over time with numerical samples. These samples can be computed offline and stored in tables, or can be generated in real time. Either way, the numerical samples are evaluations of the transmit waveform functions at the corresponding sample instant in time. The receiver filter coefficients, or correlation templates, or LO waveforms are typically represented by numerical samples. These samples may be computed offline in advance and stored, or generated in real time as needed.

A receiver with direct sampling and digital I/Q demodulation acquires and samples a number N of analog measurement values at a constant time interval Ts, which are converted to the digital domain using an analog-to-digital converter (ADC), yielding a vector of digital receive samples. For I/Q demodulation down-mixing, this sample vector is then element-wise multiplied with a) cos(2*pi*phi(k*Ts)+phi0) for the in-phase component, and b) with sin(−2*pi*phi(k*Ts)−phi0) for the quadrature component, then dot-product multiplying the resulting vectors with a low-pass filter function (e.g., a Hann window function) yielding in-phase and quadrature component of a receive signal phasor. For constant carrier frequencies fc, phi(k*Ts)=fc*k*Ts. For a time-variant carrier frequency fc(t), the phase phi(k*Ts) is the integral of fc(t) over time.

The frequency fc(t) is the carrier (or 'stimulus') frequency employed at the system transmitter(s), and it can be a function of time t. When fc is changing over time, fc(t) is the instantaneous carrier frequency. The so-called chip length N can, e.g., be N=1000, and the sampling interval Ts can, e.g., be Ts=1/(2.5 MHz).

A coherent homodyne receiver demodulates the signal (mix down) with a local oscillator (LO) whose frequency tracks fc over time. The LO has a pair of outputs, I and Q linked by 90° phase rotation. The mixer outputs are then filtered with low pass filters, yielding at the end of a chip two DC values, the I and Q components of the phasor. Correlators compute the correlation between the vector ADC samples (the I and Q vectors are the components of the phasor) belonging to a chip and two template vectors, I_coeff and Q_coeff. These templates are computed as sinusoids tracking the instantaneous frequency fc=Fc(t) and a phase difference of 90° is kept between I_coeff and Q_coeff. This can be achieved by using sine and cosine functions. Optionally, a filter to attenuate noise is added if a windowing function, like the raised cosine or Hann function, is to be applied either to the vector of ADC samples or to the I_coeff and Q_coeff. Two correlation values are computed of a chip duration, corresponding to the I and Q components of the phasor. Various curve fitting algorithms can also be used to best fit two parameters of a sinusoidal function: phase and amplitude, for example, until the error between the vector of ADC samples and the windowing function is reduced, or reduced below a threshold value. Nonlinear optimization techniques may be used.

By using a quadrature modulation (based on a phase shift of 90°), a receiver can scan a touchscreen twice as fast and concurrently measure multiple phasers over overlapping time intervals.

Regarding transmitter quadrature stem functions and two transmit groups, starting from the instantaneous carrier frequency function fc=Fc(t) and its integral, IFc(t), an instantaneous phase function can be defined: phi(t) =2*pi*IFc(t)+phi0, where phi0 is an arbitrary constant. From phi(t), four sinusoidal functions can be computed, adding each time a 90° phase rotation: stem0=cos(phi+0*pi), stem1=cos(phi+0.5*pi), stem2=cos(phi+1.0*pi), stem3=cos(phi+1.5*pi). The four sinusoidal functions are the "stems" for creating the actual transmitted waveforms.

Regarding groups, these four functions may be divided into two transmission groups: stem0 and stem2 belong to the group TXI, while stem1 and stem3 belong to the group TXQ.

Each function from TXI has a +90° or −90° phase difference when compared to any function from group TXQ, which is called "quadrature." Further, two functions within a group may have a 180° phase difference, which is called "polarity inversion." This means that change of mutual capacitances driven by waveforms from group TXI and exhibit a phasor deviation which is perpendicular to phasor deviations otherwise caused by changes of mutual capacitances driven by the other waveforms from group TXQ. Memory-less nonlinear operation on stem (t) functions in general may not affect the properties of quadrature. Therefore, stem function can be shifted. This means the waveforms actually used to drive transmit electrodes can be sinusoidal, square, or impulse, without limitation.

Regarding CDMA codes, it is possible to drive TX electrodes according to one combined CDMA code or two independent CDMA codes.

FIG. 1 shows quadrature TX superposition of signals, using a phase shift of 90 degrees. The sinusoidal waveform transmit signal driving $tx_1$ electrodes is at 90° phase rotation (quadrature) relative to the sinusoidal waveform transmit signal driving $tx_2$ electrode. The sinusoidal waveform transmit signal driving $tx_3$ electrodes is at 90° phase rotation (quadrature) relative to the sinusoidal waveform transmit signal driving $tx_4$ electrode. The transmit signals are transmitted for two time periods (chip1 and chip2). The amplitude and phase of the phasors are measured by receive electrodes ($rx_1$, $rx_2$, $rx_3$, and $rx_4$) during both chip1 and chip2. The phasor measured by $rx_3$ during chip1 indicates an interfering object (e.g., finger) is proximate at that time. The transmit signal transmitted by $tx_2$, which is in phase (I), and received by $rx_3$ is reduced in magnitude during chip1 by an interfering object, so that the amplitude of the phasor is reduced and the phase of the phasor is changed from a 45 degree position to a position of about 50 degrees, wherein 0 degrees is the horizontal axis extending to the right, 90 degrees is the vertical axis extending up, 180 degrees is the horizontal axis extending to the left, and 270 degrees is the vertical axis extending down.

FIGS. 2A through 2D show quadrature TX superposition.

Figure 2A:
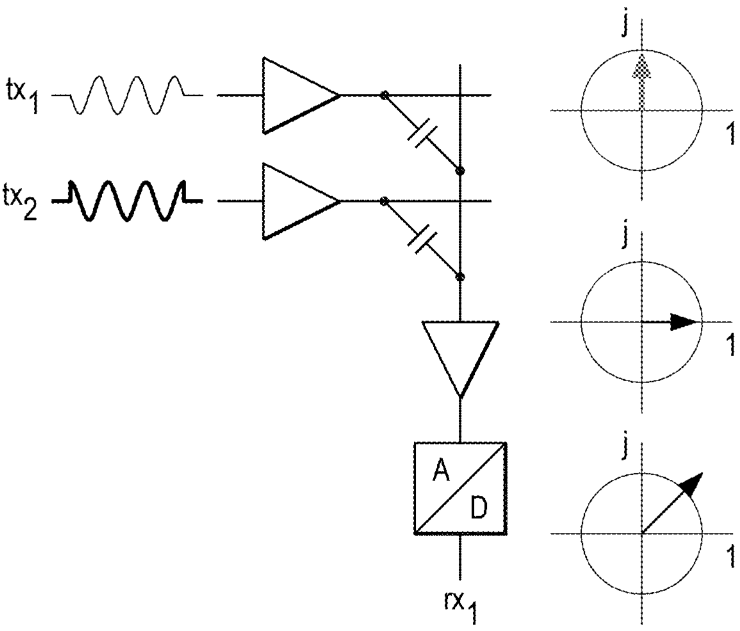
FIG. 2A shows a phasor measured by a receiver when there are no interferences of mutual capacitances between two transmitters with transmit signals in quadrature.

FIG. 2A shows a sinusoidal transmit signal driving transmit electrodes $tx_1$ and $tx_2$ with a phase shift of 90 degrees between the sinusoidal transmit signals so the signals are in quadrature. There are no interferences of the mutual capacitances where the transmit electrodes $tx_1$ and $tx_2$ form mutual capacitance nodes with the receive electrode $rx_1$. The component signal of the phasor received from $tx_1$ has amplitude equal to one (1) and phase of ninety (90) degrees, and the component signal of the phasor received from $tx_2$ has amplitude equal to one (1) and phase of zero (0) degrees. Thus, the phasor of the signal received by $rx_1$ has amplitude equal to 1.4142 (square root of 2) and phase of forty-five (45) degrees.

Figure 2B:
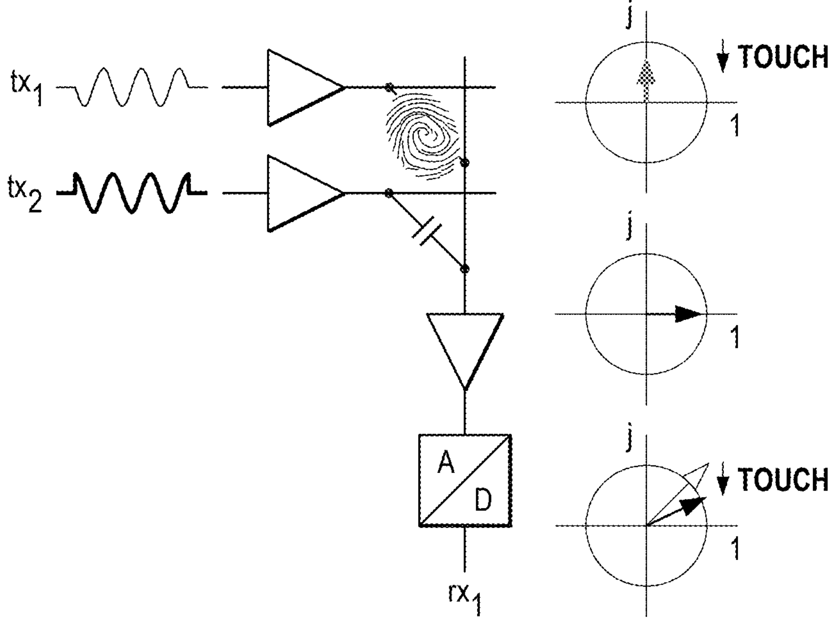
FIG. 2B shows a phasor measured by the system of FIG. 2A when there is an interference of the first mutual capacitance where a transmit electrode forms a mutual capacitance node with a receive electrode.

FIG. 2B shows a sinusoidal transmit signal driving transmit electrodes $tx_1$ and $tx_2$ with a phase shift of 90 degrees between the sinusoidal transmit signals so the signals are in quadrature. There is an interference of the mutual capacitance where the transmit electrode $tx_1$ forms a mutual capacitance node with the receive electrode $rx_1$. The component signal of the phasor received from $tx_1$ has amplitude equal to seven tenths (0.7) and phase of ninety (90) degrees, and the component signal of the phasor received from $tx_2$ has amplitude equal to one (1) and phase of zero (0) degrees. Thus, the phasor of the signal received by $rx_1$ has amplitude equal to 1.22 (square root of 1.49) and phase of thirty-five (35) degrees. For comparison, the phasor with amplitude equal to 1.4142 and phase of forty-five (45) degrees is shown as a grey arrow.

Figure 2C:
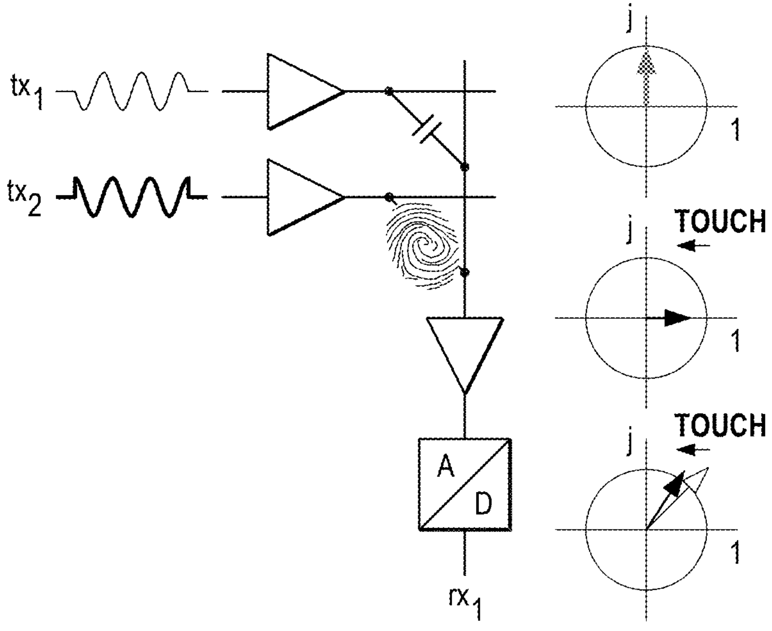
FIG. 2C shows a phasor measured by the system of FIG. 2A when there is an interference of the second mutual capacitance where another transmit electrode forms a mutual capacitance node with the receive electrode.

FIG. 2C shows a sinusoidal transmit signal driving transmit electrodes $tx_1$ and $tx_2$ with a phase shift of 90 degrees between the sinusoidal transmit signals so the signals are in quadrature. There is an interference of the mutual capacitance where the transmit electrode $tx_2$ forms a mutual capacitance node with the receive electrode $rx_1$. The component signal of the phasor received from $tx_1$ has amplitude equal to one (1) and phase of ninety (90) degrees, and the component signal of the phasor received from $tx_2$ has amplitude equal to seven tenths (0.7) and phase of zero (0) degrees. Thus, the phasor of the signal received by $rx_1$ has an amplitude equal to 1.22 (square root of 1.49) and phase of fifty-five (55) degrees. For comparison, the phasor with amplitude equal to 1.4142 and phase of forty-five (45) degrees is shown as a grey arrow.

Figure 2D:
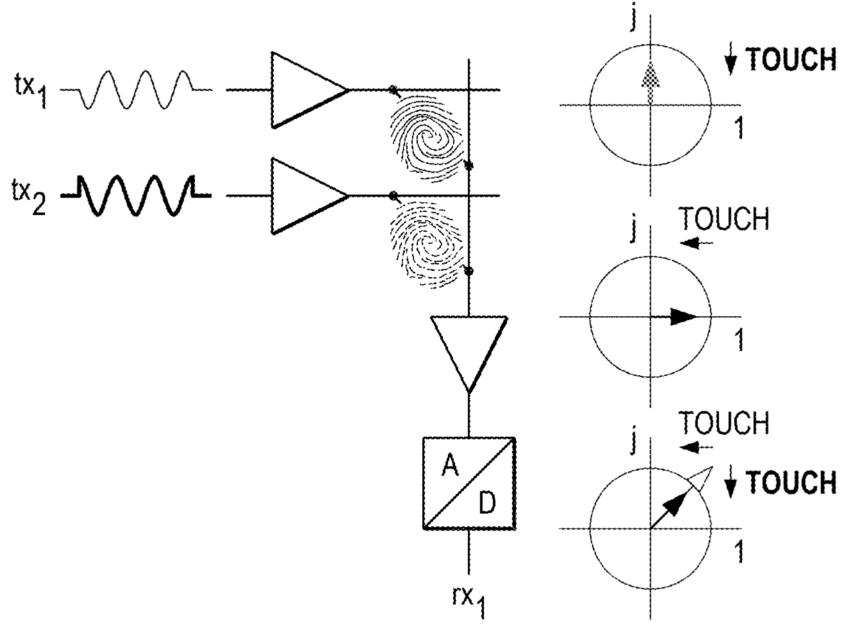

FIG. 2D shows a sinusoidal transmit signal driving transmit electrodes $tx_1$ and $tx_2$ with a phase shift of 90 degrees so the signals are in quadrature. There is an interference of the mutual capacitance where the transmit electrode $tx_1$ forms a node with the receive electrode $rx_1$ and an interference of the mutual capacitance where the transmit electrode $tx_2$ forms a mutual capacitance node with the receive electrode $rx_1$. The component signal of the phasor received from $tx_1$ has amplitude equal to seven tenths (0.7) and phase of ninety (90) degrees, and the component signal of the phasor received from $tx_2$ has amplitude equal to seven tenths (0.7) and phase of zero (0) degrees. Thus, the phasor of the signal received by $rx_1$ has amplitude equal to one (1) (square root of 1.0) and phase of forty-five (45) degrees. For comparison, the phasor with amplitude equal to 1.4142 and phase of forty-five (45) degrees is shown as a grey arrow. As can be seen, the phasor of the signal received by $rx_1$ has a reduced amplitude as compared with the phasor of FIG. 2A.

The quadrature TX superposition may provide unambiguous interfering object positions. The quadrature TX superposition may allow for double the number of TX signals, i.e. electrodes, to be transmitted and measured simultaneously, while the SNR remains unchanged, compared to CDMA.

A transmit electrode TX matrix stack may allow manipulations, including: rows reordered, any row multiplied by −1, columns reordered, any column multiplied by a complex number of norm 1. Matrices can be manipulated before being stacked in Θ, and Θ can be further manipulated, where $$j = \sqrt{-1}$$

$$\Theta = \begin{bmatrix} H_n \\ jH_n \end{bmatrix}$$

where $H_n$ is an orthogonal matrix of order n; for example, a Hadamard matrix, and $$\Theta = \begin{bmatrix} H_n \\ jP_n \end{bmatrix}$$

where $H_n$ and $P_n$ are two orthogonal matrices of order n but are not necessarily identical or equivalent. For example, a Hadamard matrix and a Paley type I matrix. Equivalent in this context means $P_n$ can be obtained from $H_n$ by linear combinations of its rows.

Figure 3:
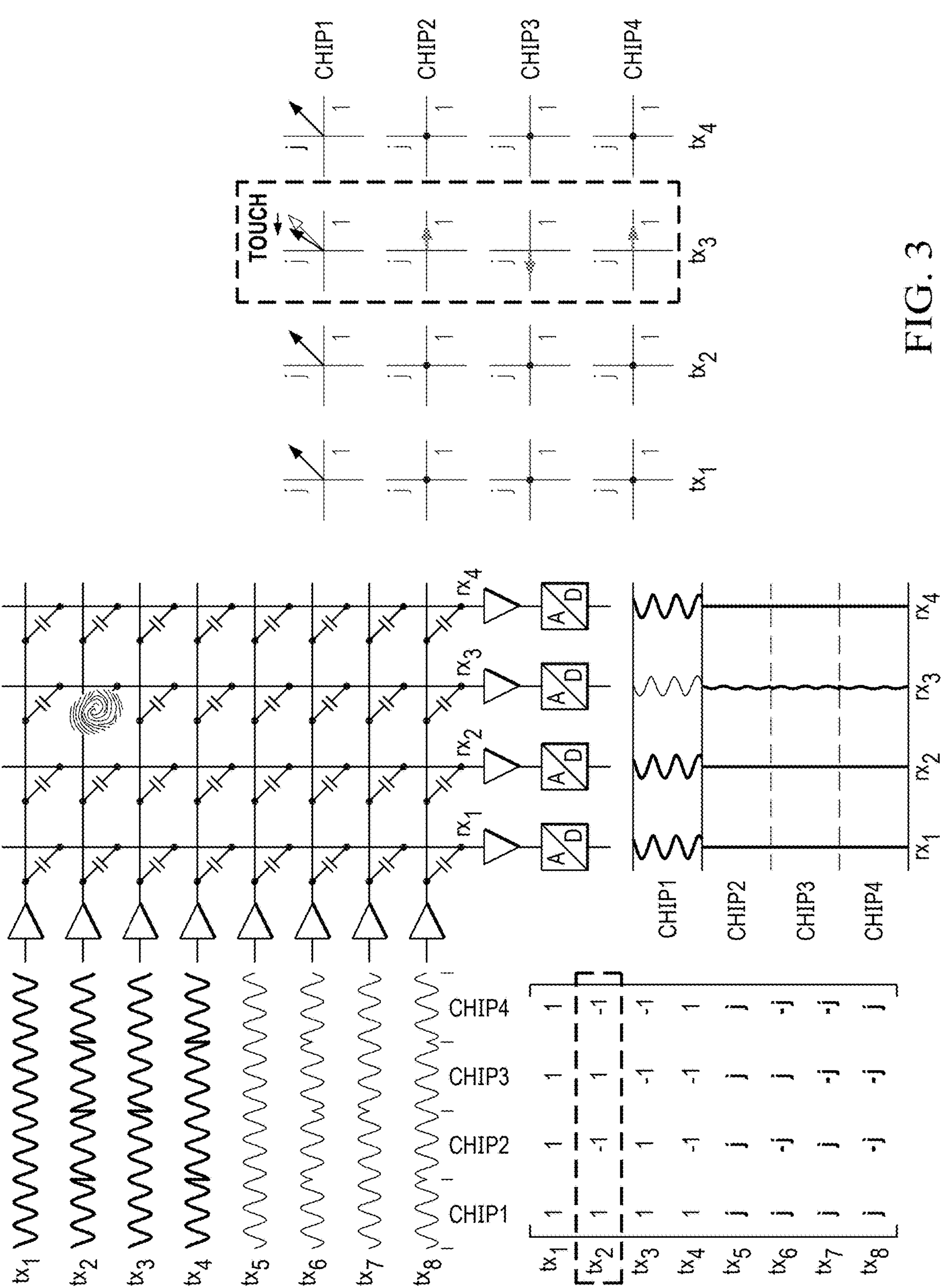
FIG. 3 shows a quadrature phase shift key (QPSK) driving scheme (based on a phase shift key of 90° rotations) combined with CDMA (based on 180° rotations).

FIG. 3 shows how two different forms of orthogonality may be combined (QM+CDMA=QCDMA). The transmit signals of $tx_5$-$tx_8$ are phase shifted by 90 degrees relative to the transmit signals of $tx_1$-$tx_4$. An orthogonal code may be used for CDMA extra-chip modulation, where quadrature modulation may happen within a chip (intra) or at the transition between chips (extra). A superposed TX owing to orthogonality may be brought by quadrature intra-chip modulation, where modulation may happen within a chip (intra) or at the transition between chips (extra). CDMA may be decoded as measured I/Q vectors instead of scalars. In the example shown in FIG. 3, all four phasors received at the receive electrodes during the four chips are decoded by CDMA to determine the mutual capacitance node $tx_2$/$rx_3$ is being interfered.

Figure 4A:
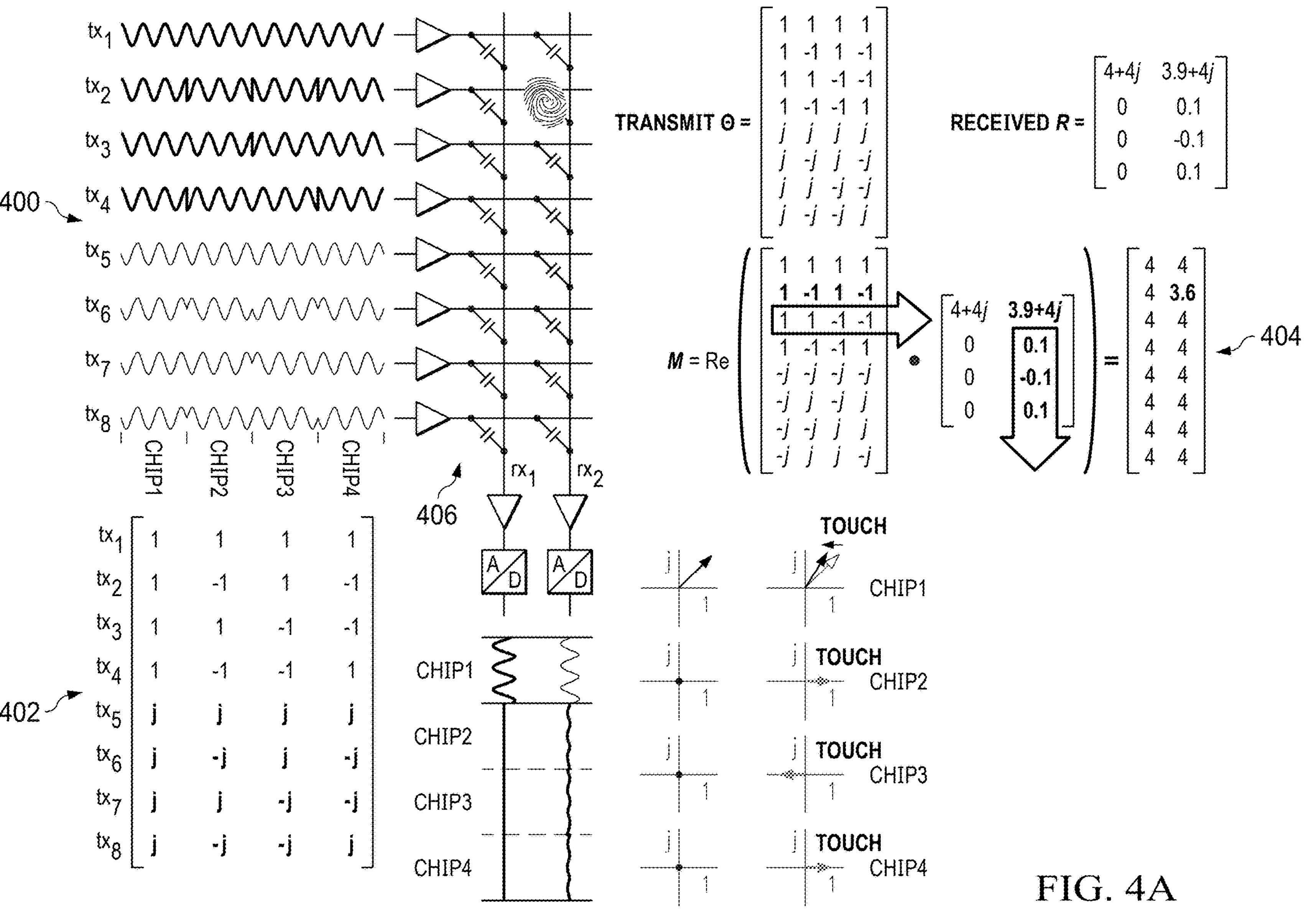
FIG. 4A shows a general case of QPSK decoding using the complex conjugate of ⊙, so that the correlation of an imaginary number with itself yields a positive result.

FIG. 4A shows a general case of QCDMA decoding, where the matrix of received chips R contains complex numbers. In the signal array 400 shown adjacent transmit electrodes $tx_1$-$tx_8$, the columns are chip time intervals, and the rows transmit electrodes. A numerical matrix 402 corresponds to the signal array 400. The decoding uses the complex conjugate of theta matrix Θ, so that the correlation of an imaginary number with itself yields a positive result. An alternative is to use the complex conjugate of R instead. The conjugate of the transmit signal matrix Θ is multiplied by the receive signal matrix R, of which the real part is kept with the Re( ) function to produce the mutual capacitance matrix M 404. The mutual capacitance matrix M 404 corresponds to the mutual capacitance nodes 406 comprising transmit electrodes $tx_1$-$tx_8$ and receive electrodes $rx_1$-$rx_2$, wherein all of the mutual capacitances have a measured signal value of 4, except for the mutual capacitance corresponding to the mutual capacitance node at $tx_2$/$rx_2$, which has a measured signal value of 3.6 indicating an interference.

Figure 4B:
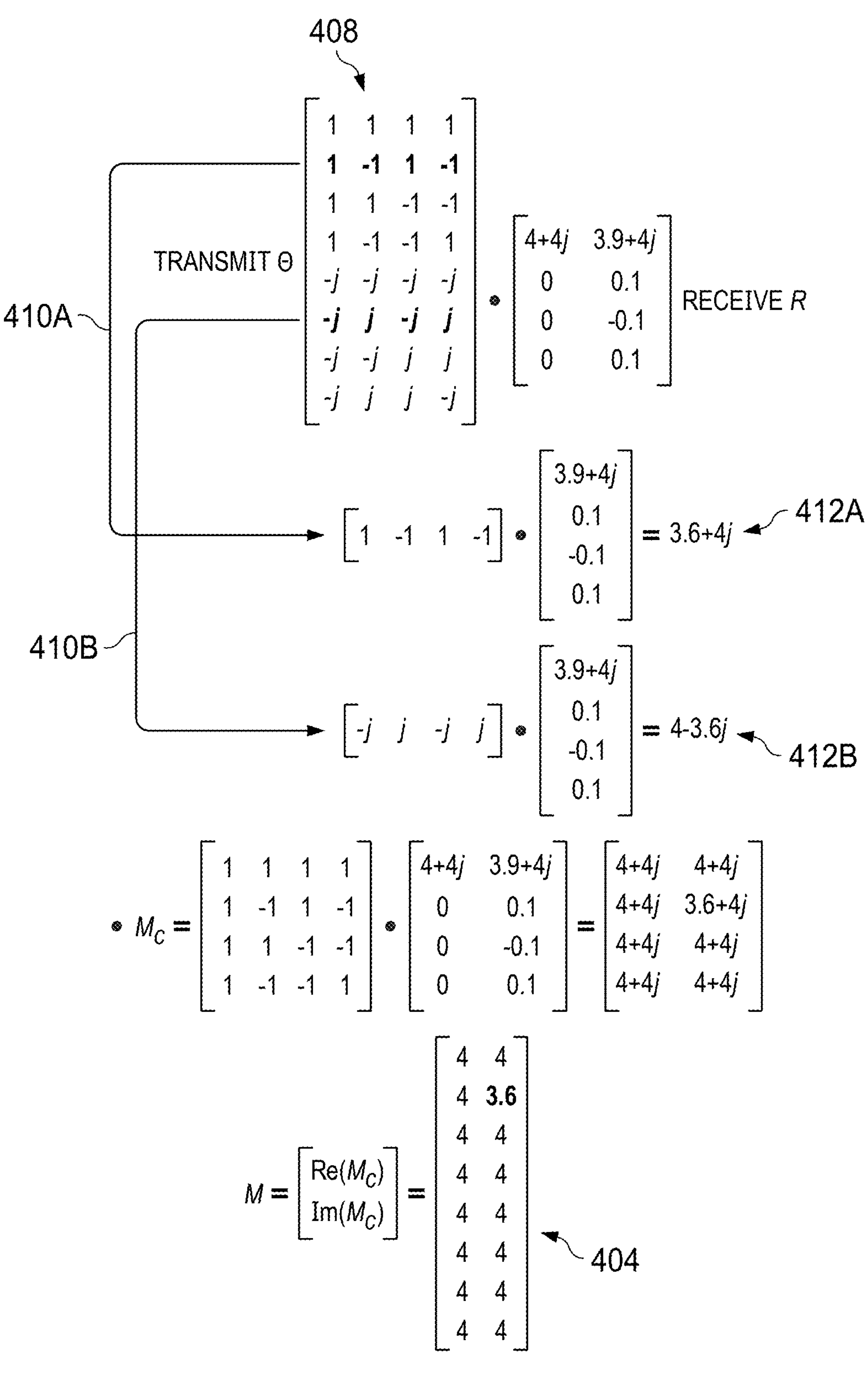
FIG. 4B shows an alternative case of QPSK decoding wherein two highlighted rows are related so that $M_c$ may be computed, and real and imaginary components of $M_c$ may be mapped to their respective position to recreate an expected matrix for mutual capacitances.

FIG. 4B shows an optimization of QM decoding. In FIG. 4A there is redundancy when computing $\overline{\Theta}$. R: half Θ rows are copies of other rows, oriented along the imaginary (j) axis. For example, the row 410A for $tx_2$ and the row 410B for $tx_6$ are related by a factor −j. The dot product of rows 410A and 410B from transmit signal matrix Θ by the second column of the receive signal matrix R produce decoded phasors 412A and 412B. As noted, the real component of phasor 412A corresponds to the mutual capacitance between $tx_2$ and $rx_2$ reported in the mutual capacitance matrix 404. Similarly, the real component of phasor 412B corresponds to the mutual capacitance between $tx_6$ and $rx_2$. Since the row 410A for $tx_2$ and the row 410B for $tx_6$ are related by a factor −j, the phasors 412A and 412B are related too by a factor −j.

Therefore, it is possible to compute a complex matrix of mutual capacitance $M_c$ using half of the matrix Θ and map the real and imaginary components of the resulting product to their respective positions to recreate an expected 8×2 matrix (M) for mutual capacitance.

Figure 5:
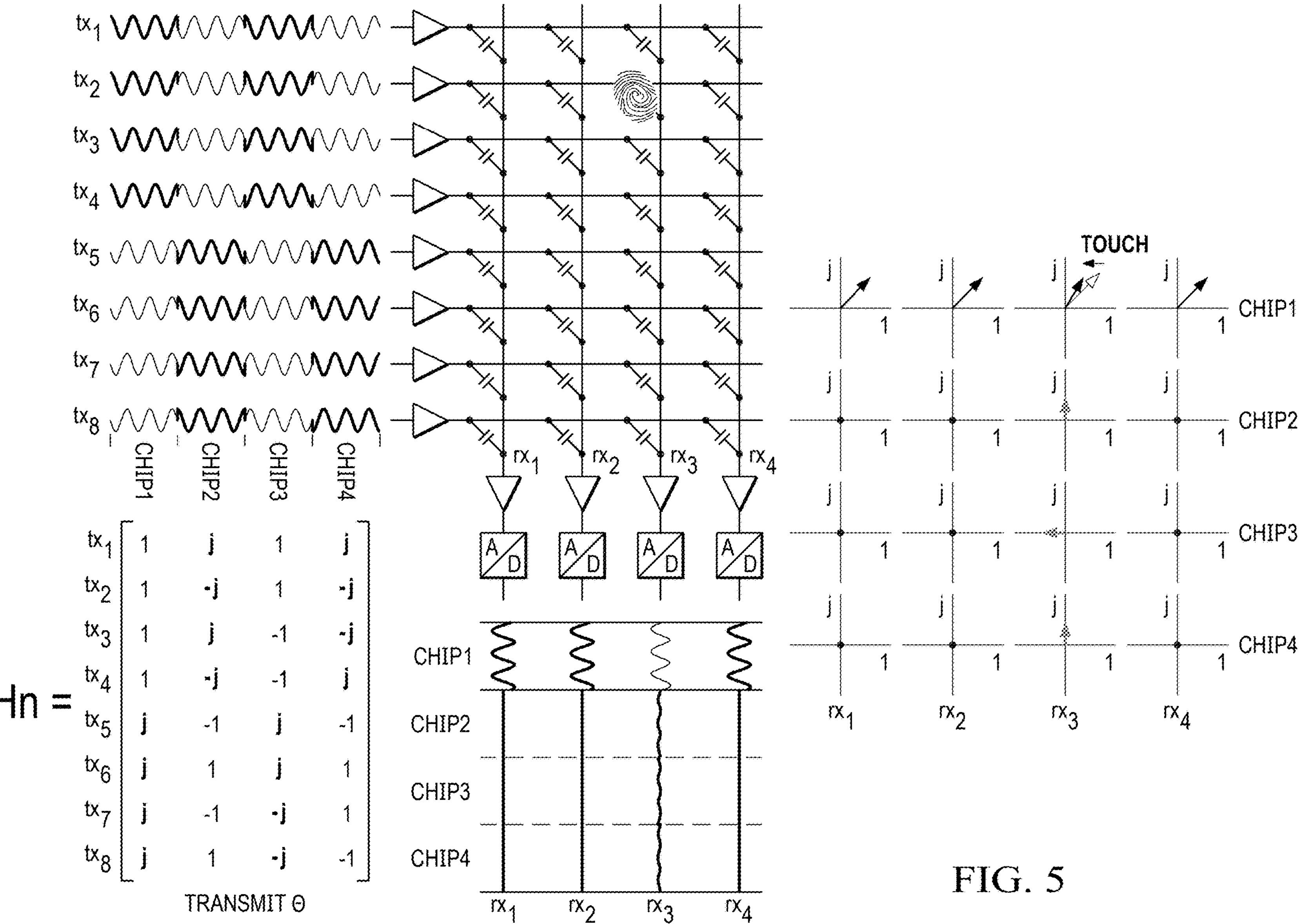
FIG. 5 shows code variations where rows of the code matrix may be reordered, omitted, or multiplied by −1, and columns of the code matrix may be multiplied by a unity vector of arbitrary phase, two columns of the code matrix may be swapped, and code matrices may be changed between two measurement frames.

FIG. 5 shows code variations, wherein the $2^{nd}$ and $4^{th}$ columns of the transmit matrix have been multiplied by the imaginary number j. In other examples, rows of the code matrix can be reordered, rows of the code matrix can be omitted, rows of the code matrix can be multiplied by −1 (but typically not by j, since it then would look like another row of the matrix and therefore loose orthogonality), columns of the code matrix can be multiplied by a unity vector of arbitrary phase, two columns of the code matrix can be swapped, and code matrices can be changed between two measurement frames.

As shown in FIG. 5 the chip boundaries are the same for all used transmit electrodes, and the receivers compute one phasor at a time. An orthogonal matrix Hn is built and constitutes the CDMA code. Rows of the matrix correspond to the sequence of chips applied to the transmit electrodes (for example +1 for 0° phase, −1 for 180°). A taller matrix theta can be created by vertically concatenating two, possibly different, orthogonal matrices Hn0 and j*Hn1 to produce a matrix Theta (Transmit ⊙). The resulting second matrix sits on the imaginary axis, since j=sqrt(−1). Matrix Theta (Transmit ⊙) can be further transformed with row permutations, column permutations, or multiplication of rows by −1 or multiplication of columns by j or −j. The content of the Theta matrix (Transmit ⊙) is then mapped to selection of transmission waveforms picked from their respective transmission groups and respective polarity.

TX waveforms may have the following properties.

$$I(t)=\cos(f(t))$$

Q(t)=sin(f(t), where f(t) is a function which provides the instantaneous phase. For example, f(t)=2*pi*fc*t for a linear phase increase I(t) and Q(t) can then be further modified by adding a constant, inserting a threshold, or multiplying with an envelope function to control spectral leakage.

Figure 6A:
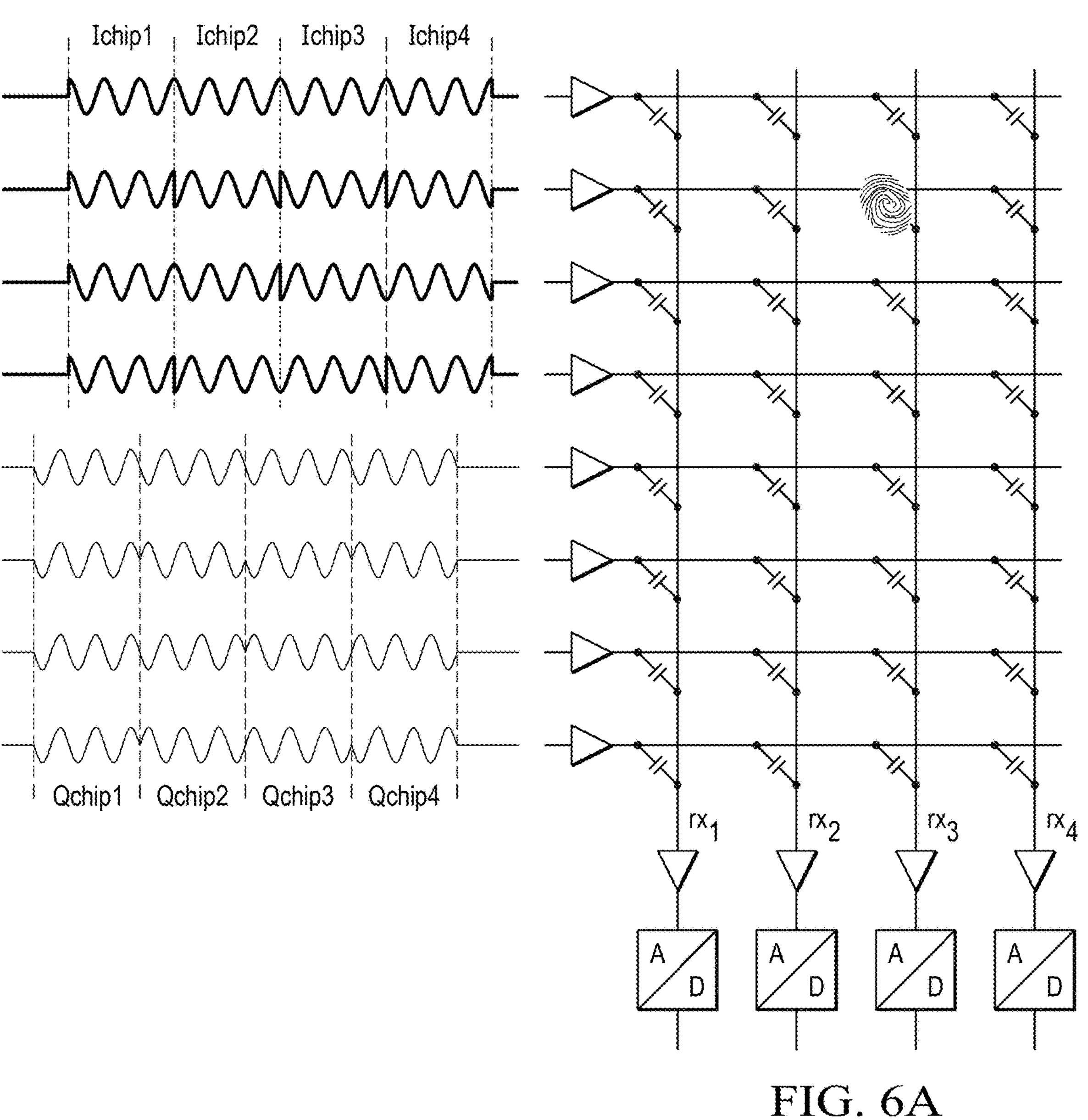
FIGS. 6A and 6B show different CDMA boundaries for Q chips and I chips where chip length for in phase and in quadrature codes need not coincide and the duration of the chips need not be equal.
Figure 6B:
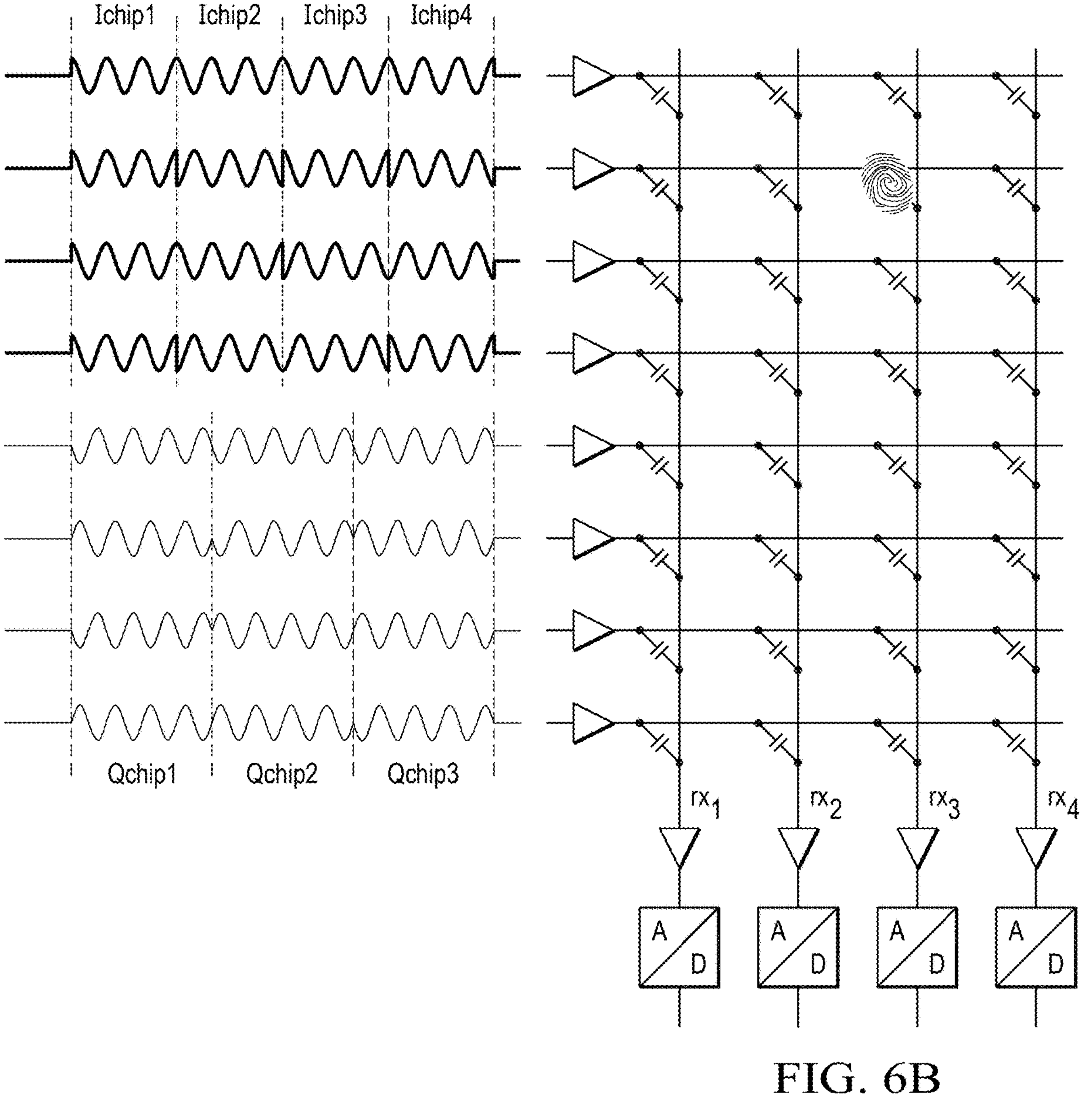
Figure 7A:
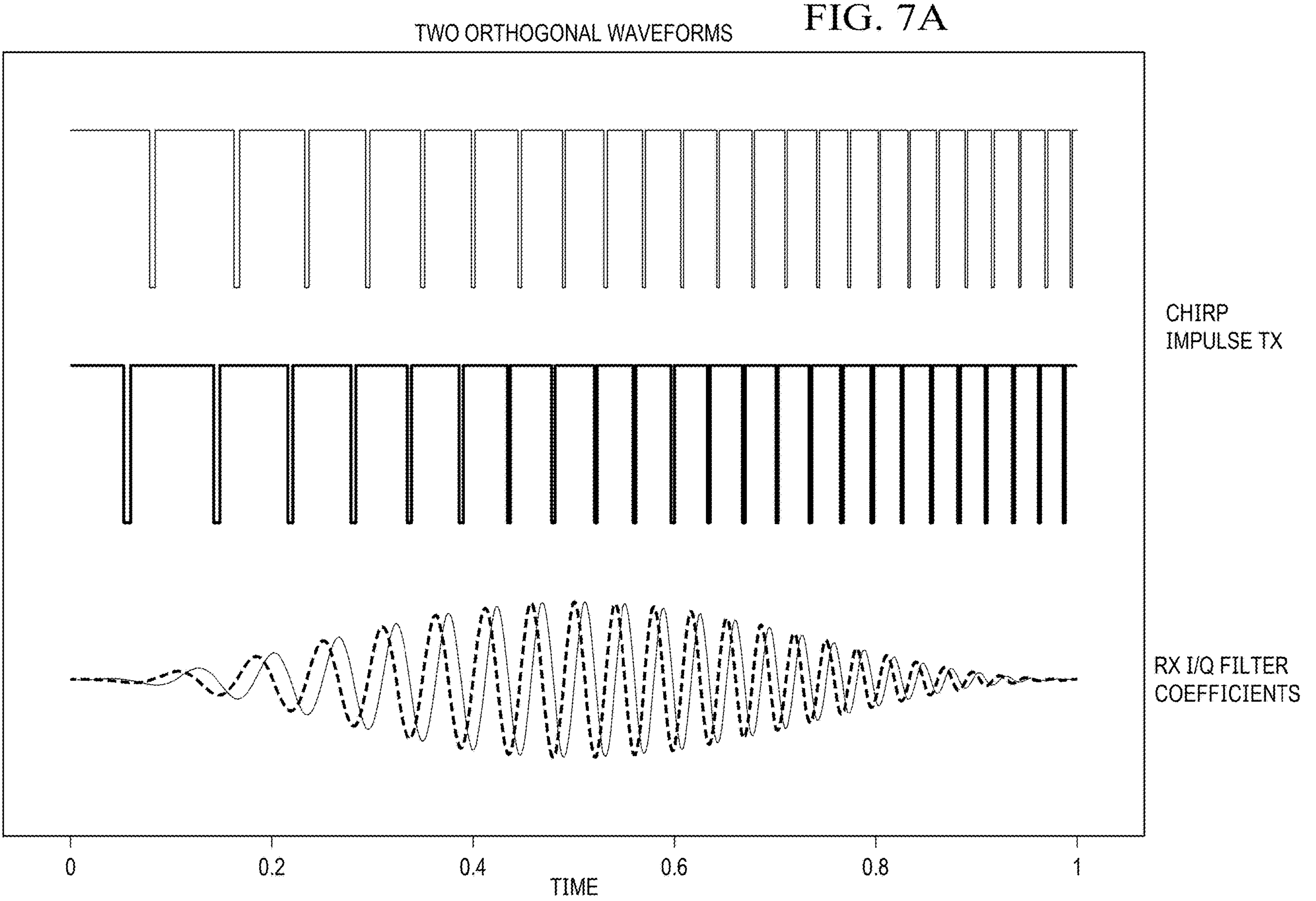
FIG. 7A shows two orthogonal TX waveforms and a corresponding RX waveform with filter coefficients for I/Q where the instantaneous frequency changes over time, and where TX waveforms are rectangular, not sinusoidal.
Figure 7B:
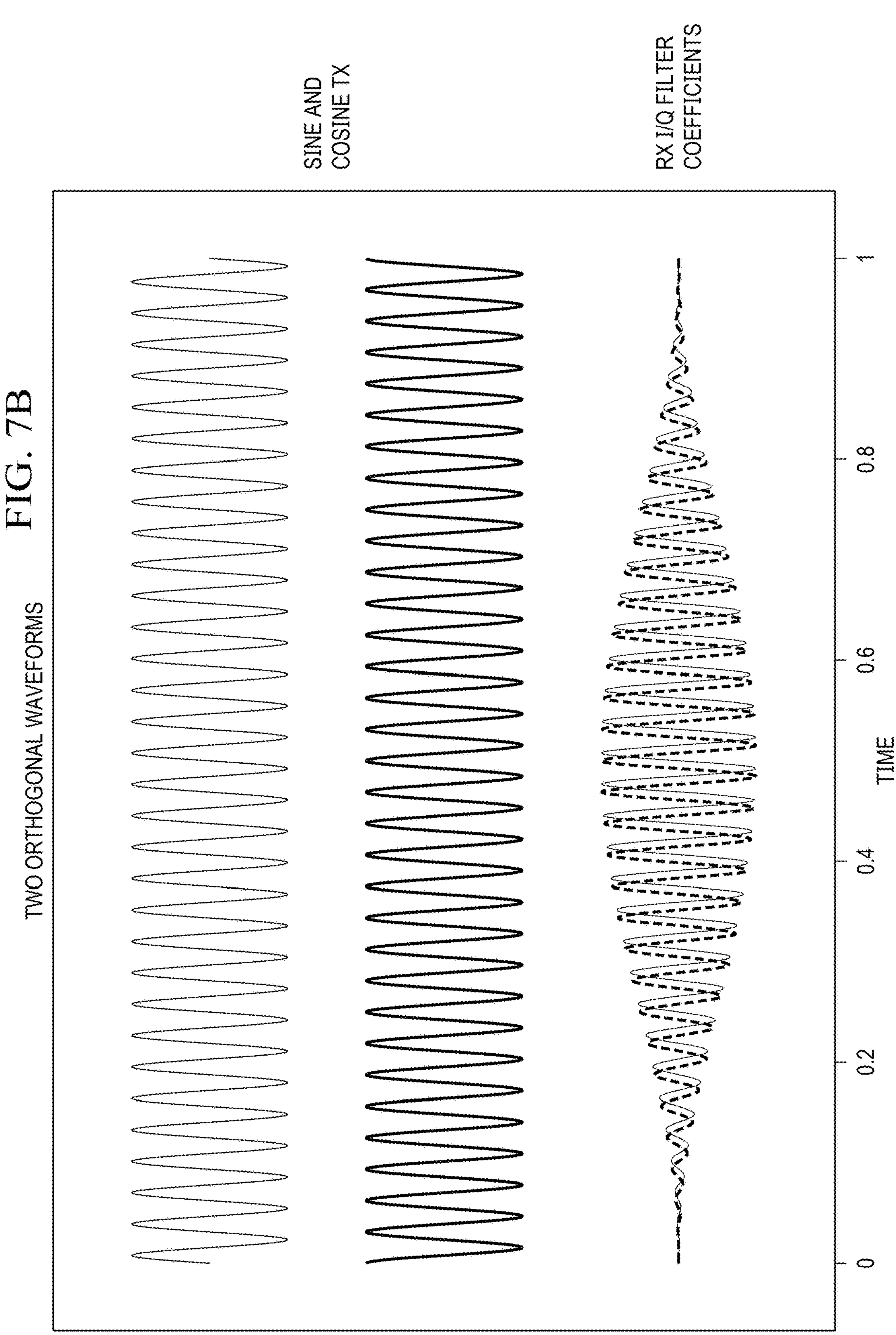
FIG. 7B shows two orthogonal TX waveforms and a corresponding RX waveform with RX I/Q filter coefficients computed from the underlying instantaneous phase function, where the frequency is constant and where the TX waveforms are sinusoidal.

FIGS. 6A and 6B show different CDMA boundaries for Q chips and I chips. These boundaries may have more complicated signal processing at the receiver. The chip length for in phase and in quadrature codes do not need to coincide. Even the duration of the chips for in phase and in quadrature do not need to be equal. Two groups of transmit electrodes can be driven simultaneously, wherein an individual group has its own, unrelated CDMA codes. The chip boundaries or even chip lengths of the first CDMA code does not need to match with the second CDMA code. The only requirement is that transmit waveforms for the first and second group are taken from TXI and TXQ and that the receivers can compute two phasers independently. FIG. 7A shows an example where the chips for in phase and in quadrature are equal, but they do not coincide. FIG. 7B shows an example where the duration of the chips for in phase and in quadrature are not equal. The I and the Q chips may share a common stem (a common instantaneous phase function) from which four orthogonal phases may be generated.

Computation of template vectors may be achieved where a sine and cosine waveforms are themselves modulated by a raised cosine function and are efficiently generated using two CORDIC algorithms and two multipliers, or three CORDIC algorithms without multipliers. A raised cosine function is a filter function used for pulse-shaping in digital modulation due to its ability to minimize inter-symbol interference, wherein the non-zero portion of the frequency spectrum of its simplest form (β=1) is a cosine function, "raised" up to sit above the f (horizontal) axis.

First case: one CORDIC algorithm generates sine and cosine, the second CORDIC algorithm generates the cosine of the raised cosine function and the multipliers produce the resulting product.

$$I\_coeff = (Sin(\alpha) * (1 - Cos(\beta)))/2$$

$$I\_coeff = (Cos(\alpha) * (1 - Cos(\beta)))/2$$

Second case: the raised cosine envelope is not the result of a multiplication, but the result of a beat effect between two tones, explained by trigonometric equivalences.

$$I\_coeff = (Sin(\alpha) - (Sin(\alpha + \beta) + Sin(\alpha - \beta)))/2$$

$$I\_coeff = (Cos(\alpha) - (Cos(\alpha + \beta) + Cos(\alpha - \beta)))/2$$

FIG. 7B shows TX orthogonal waveform and corresponding RX filter coefficient signals for I/Q. Two orthogonal waveforms in the form of chirp impulses are simultaneously transmitted. I/Q filter coefficient signals are received at a receiver.

FIG. 7A shows receiver filter coefficient signals computed from the underlying instantaneous phase function. The coefficients of the two filters share properties, where a carrier made of sine and cosine functions with the instantaneous frequency substantially matching the TX own instantaneous phase function, where f(t) is a function which provides the instantaneous phase. Local sinusoidal shape confers the property of not demodulating the harmonics. Instantaneous frequency matching TX means RX captures the TX waveforms. Sine and cosine: the two filters remain locally orthogonal, where "locally" means at the time scale where the frequency appears stable. I/Q filter coefficient signals are received at a receiver.

Figure 8A:
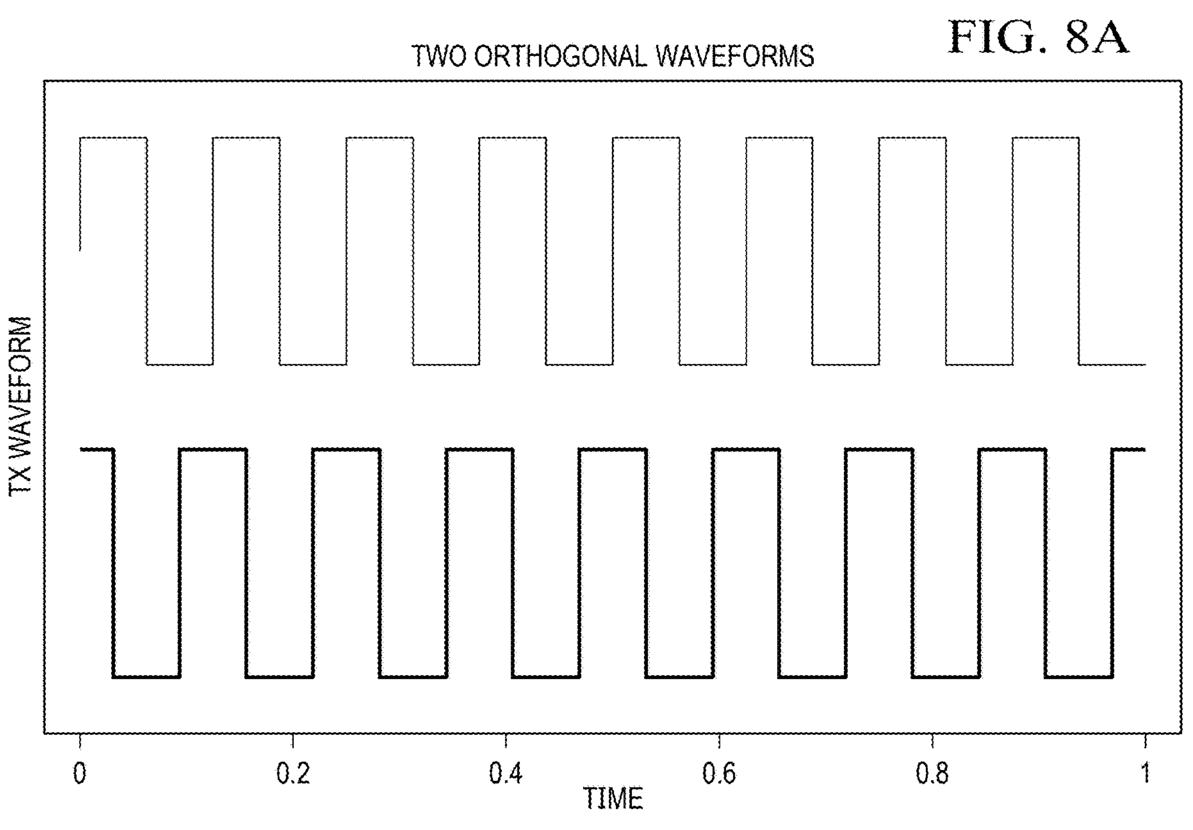
FIGS. 8A-8I show two orthogonal TX sinusoidal (sine and cosine), square, or impulses waveforms that are shifted, thresholded, or enveloped.
Figure 8B:
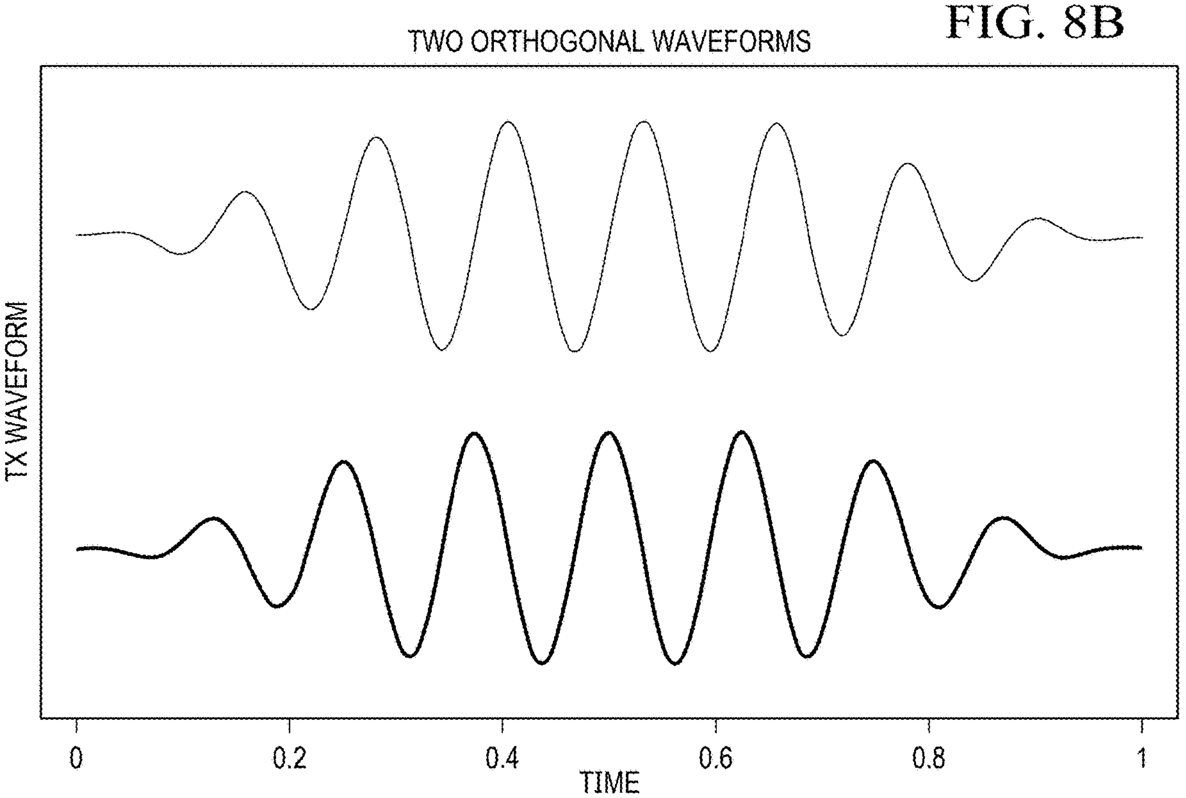
Figure 8C:
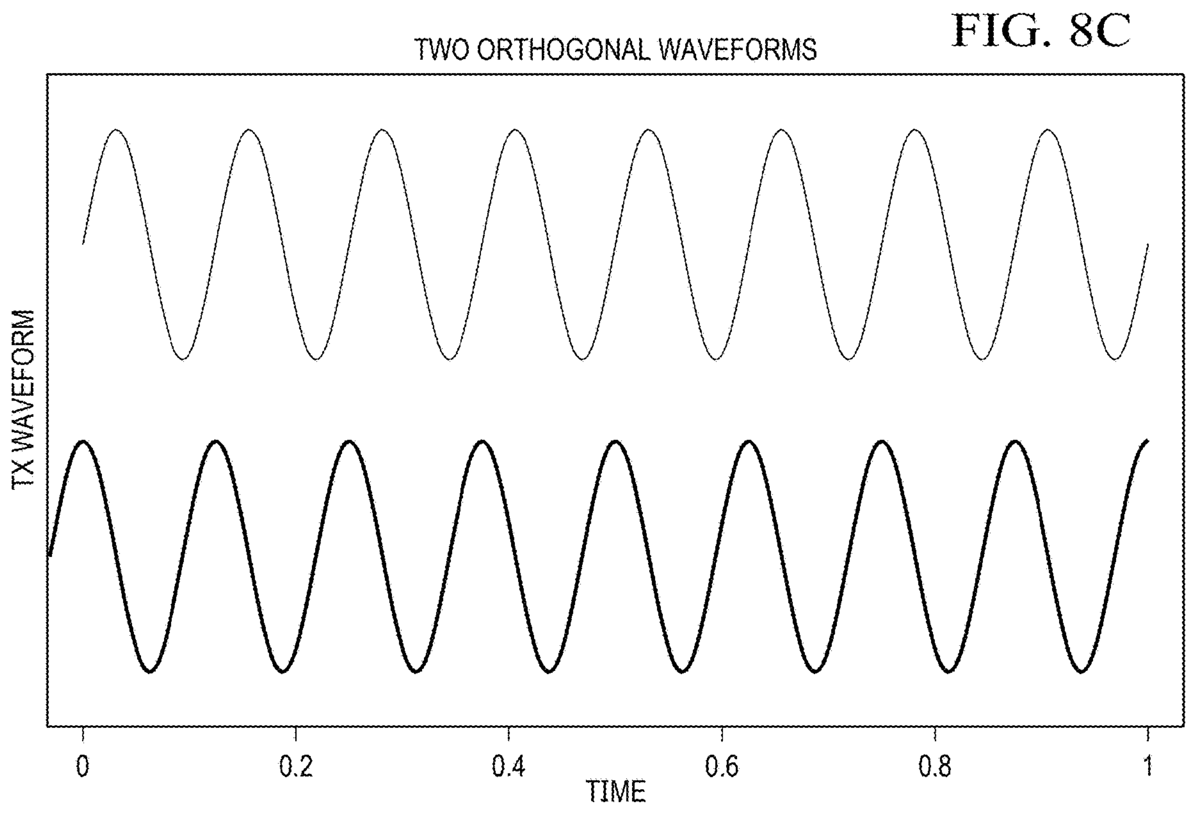
Figure 8D:
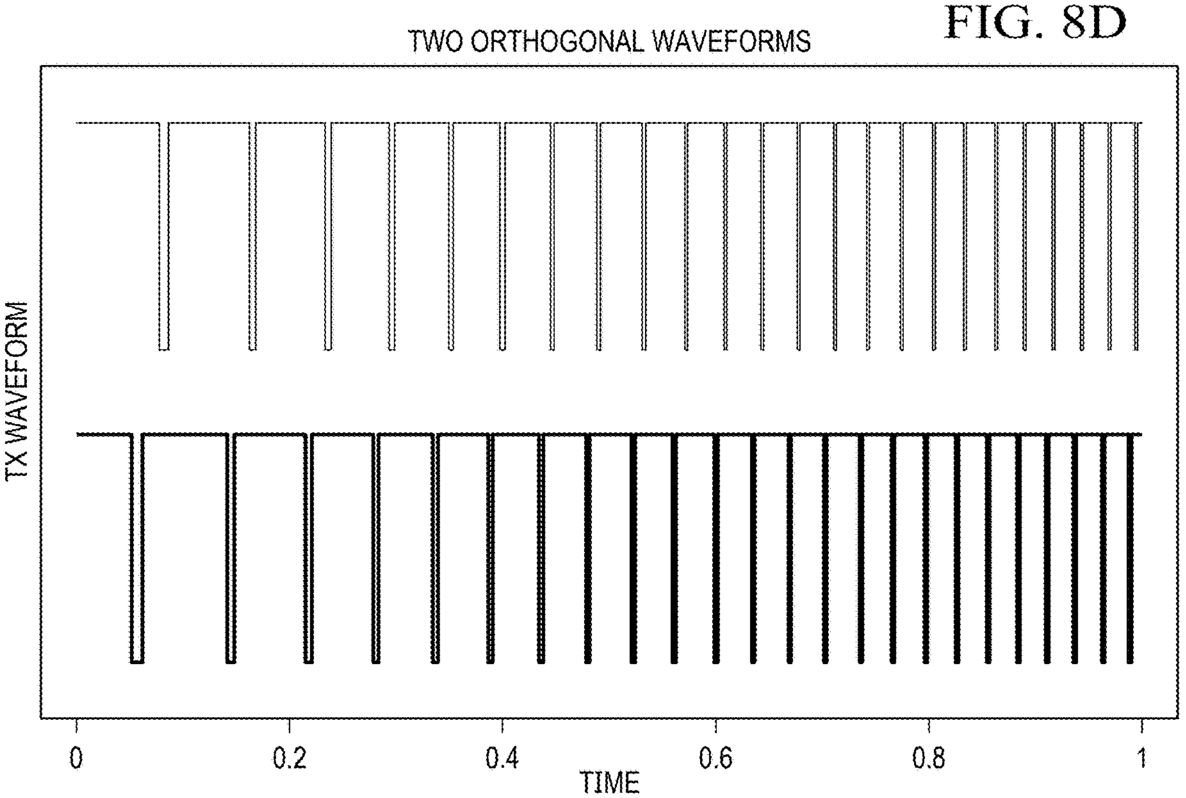
Figure 8E:
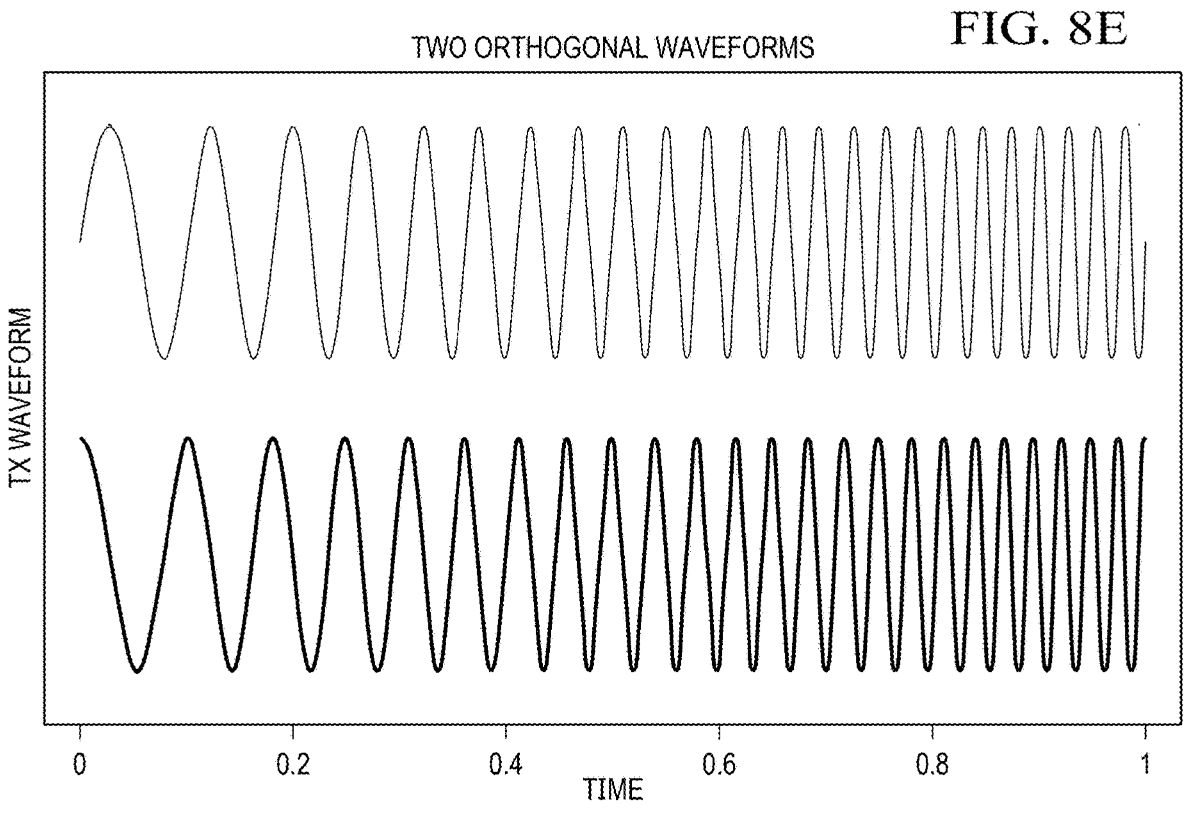
Figure 8F:
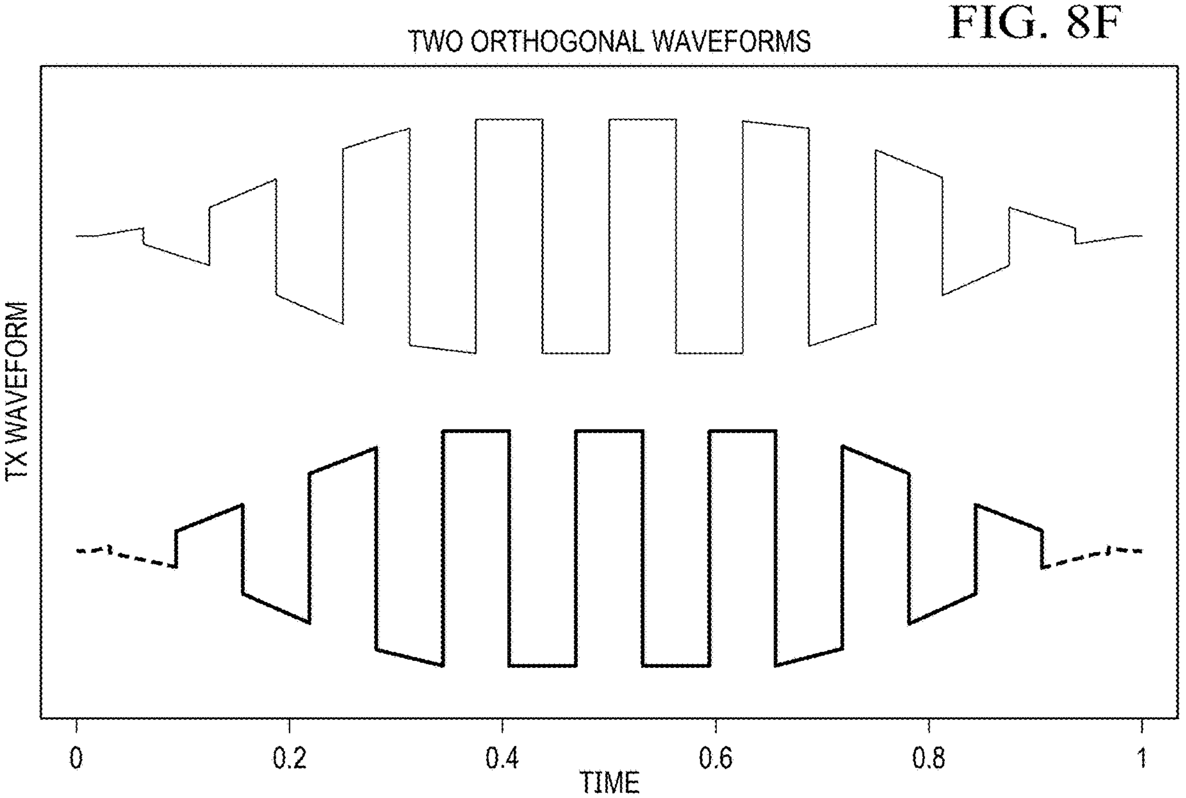
Figures 8G, 8H:
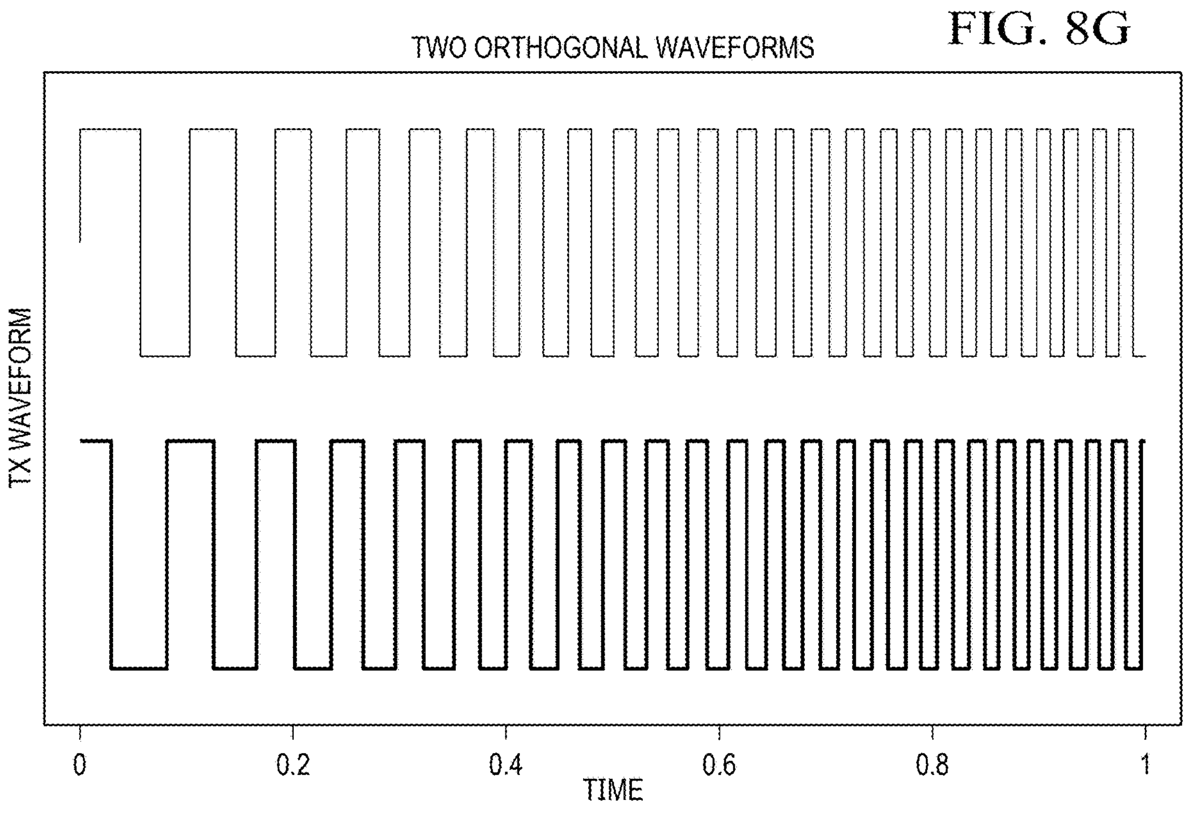
Figure 8I:
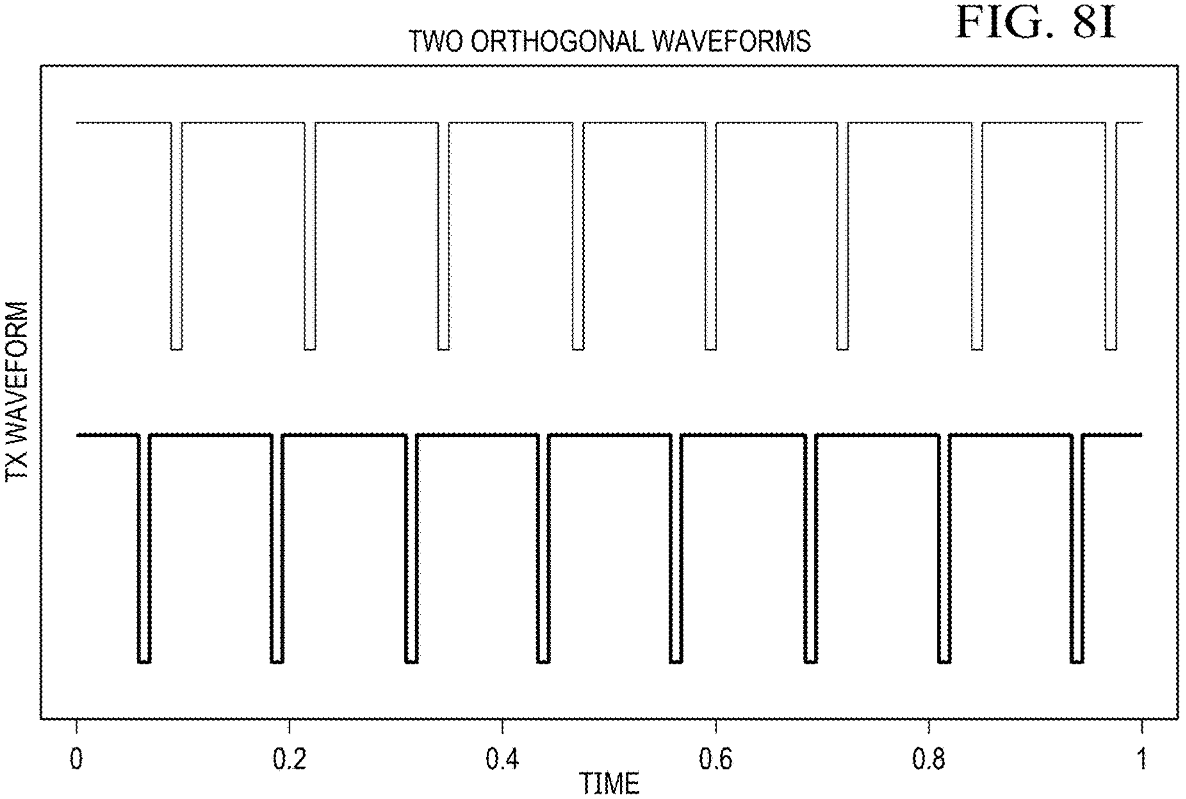

Referring to FIGS. 8A through 8I, waveforms are shown to illustrate that an envelope can be added to the signal. The waveform does not need to be periodical (chirp). The waveform does not need to be 50% duty cycle (impulses). The waveform can contain envelope shaping to control emission. The waveforms shown in FIGS. 8A through 8I share this property: they are generated from the sine and cosine functions using the same instantaneous phase argument. These waves can be further shifted and thresholded, and an envelope applied, to generate for example rectangular shapes. The sine and cosine functions using the same instantaneous phase are also used to filter the received signal. FIG. 8A shows two orthogonal square waveforms. FIG. 8B shows two orthogonal sine waveforms with an applied envelope. FIG. 8C shows two orthogonal sine waveforms. FIG. 8D shows two orthogonal chirp impulse waveforms. FIG. 8E shows two orthogonal chirp sine waveforms. FIG. 8F shows two orthogonal square waveforms with an applied envelope. FIG. 8G shows two orthogonal chirp square waveforms. FIG. 8H shows two orthogonal chirp sine waveforms with an envelope applied. FIG. 8A shows two orthogonal pulse waveforms.

The receiver may receive a stream of ADC samples that are correlated with templates of sine and cosine waves. The received signal is filtered with finite impulse response. A monodyne coherent radio receiver (monodyne synonymous to direct radio receiver or zero IF radio receiver) is followed by a low pass filter. A nonlinear regression or curve fitting are different techniques which can also determine RX amplitude and phase.

Figure 9:
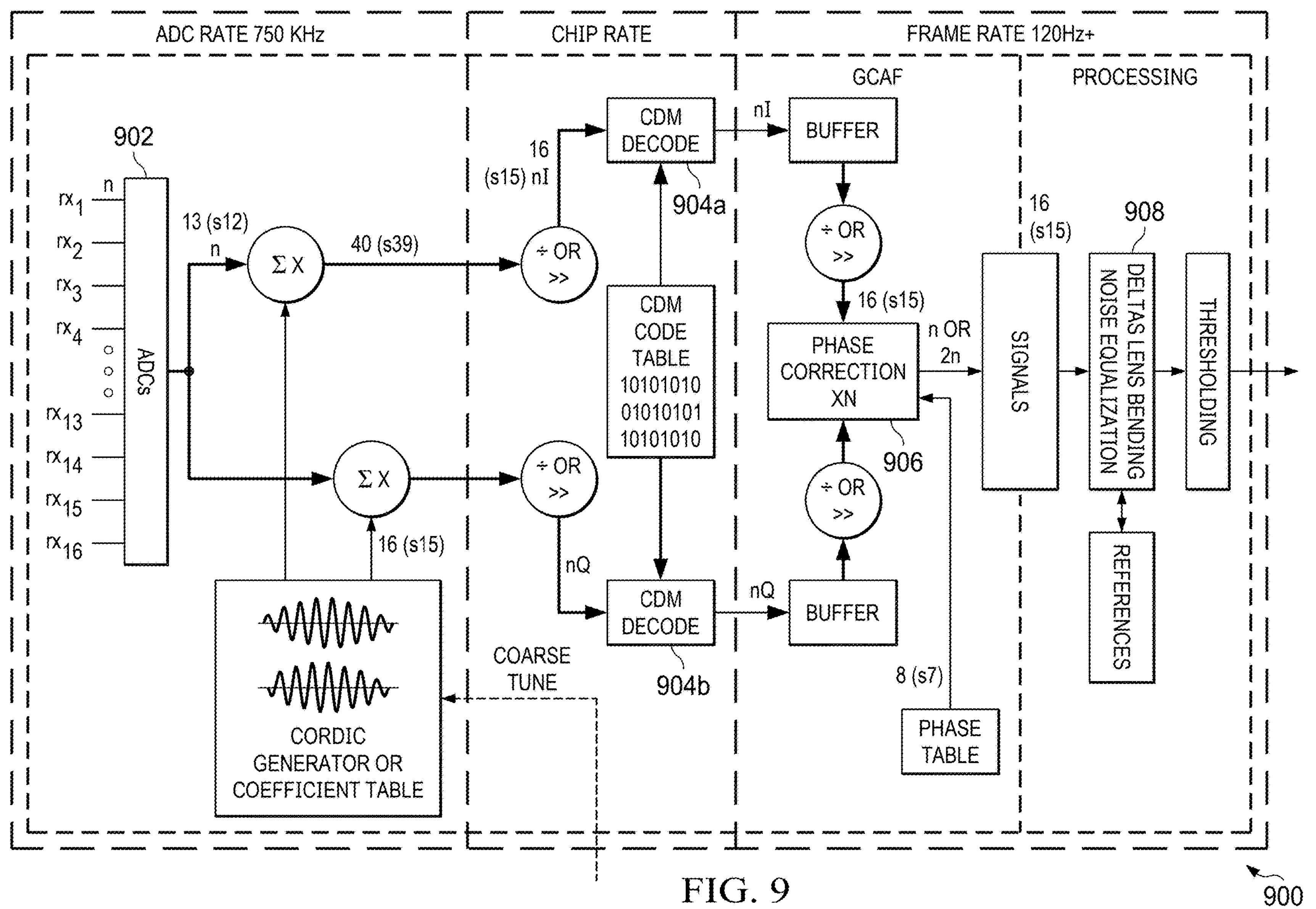
FIG. 9 shows a block diagram of a receiver implementation.

FIG. 9 shows a block diagram of a receiver 900. Transmit signals are received via receive electrodes rx1-rx16 and the signals are converted analog to digital by ADCs 902. The received ADC stream of samples is correlated with templates of sine and cosine waves modulated by an envelope function, and the result of the two correlations, and I component and a Q component form a phasor corresponding to the received chip. Tables are used to store the CDMA (sometimes noted CMD) codes used to decode the set of phasors and to produce the decoded signals. The I and Q components of the phasor are decoded by CDM decode circuits 904*a* and 904*b*, respectively. The I and Q components are then phase corrected by phase correction circuit 906. The I and Q signals are then processed by a deltas lens bending noise equalization circuit 908.

Figure 10:
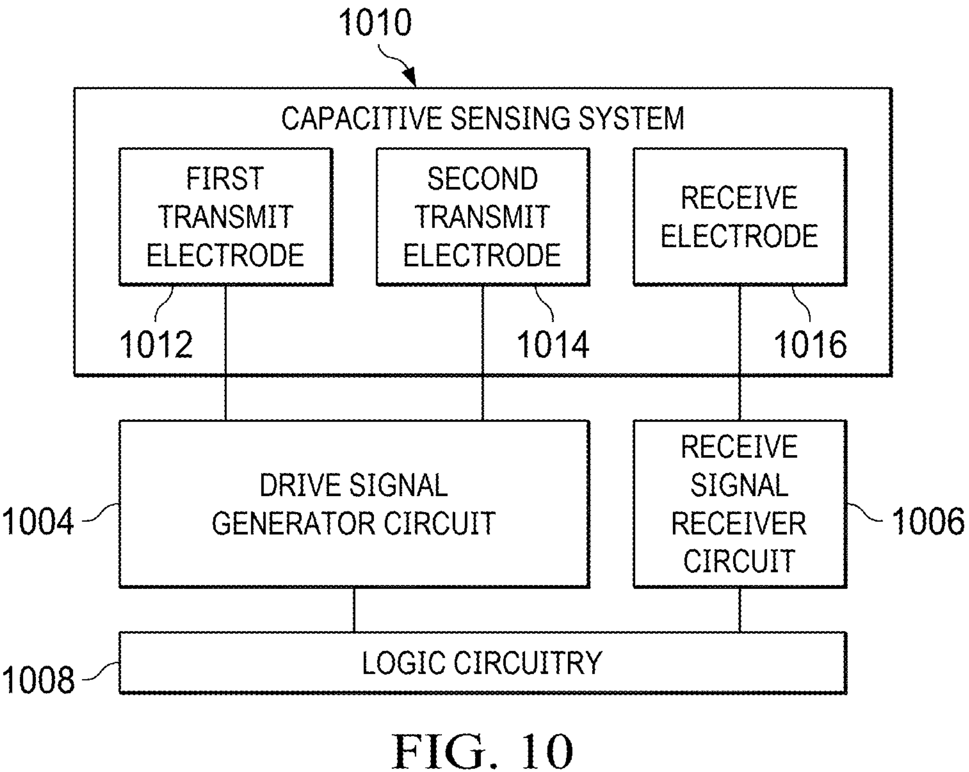
FIG. 10 shows a block diagram of a capacitive sensing system and circuitry.

FIG. 10 shows a capacitive sensing system and circuitry. A capacitive sensing system 1010 comprises first transmit electrode 1012, second transmit electrode 1014, and a first receive electrode 1016 positioned to have mutual capacitances between the transmit electrodes 1012 and 1014 and the receive electrode 1016 at mutual capacitance nodes, wherein the mutual capacitance at respective ones of mutual capacitance nodes deviates when an interfering object is proximate. A drive signal generator circuit 1004 is operatively coupled to the first and second transmit electrodes. A receive signal receiver circuit 1006 is operatively coupled to the first receiver electrode 1016. A logic circuitry 1008 is operatively coupled to the drive signal generator circuit 1004 and the receive signal receiver circuit 1006. The logic circuit is to: apply simultaneously a first drive signal to the first transmit electrode and a second drive signal to the second transmit electrode, wherein the first and second drive signals are in quadrature with each other; receive a first receive signal via the first receive electrode; measure an amplitude and a phase of the first receive signal; and identify a mutual capacitance node being interfered based on the amplitude and phase of the first receive signal.

Figure 11:
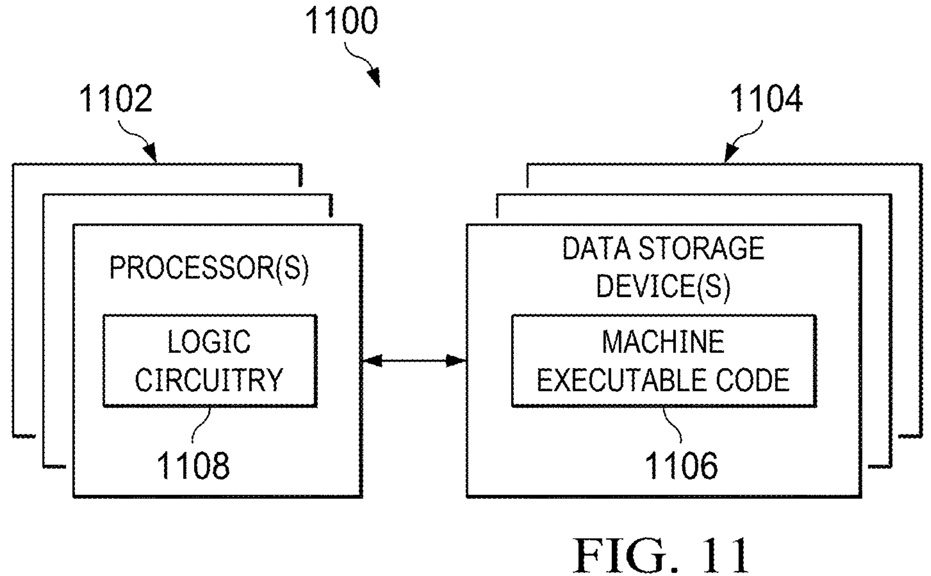
FIG. 11 shows a block diagram of circuitry that, in some aspects, may be used to implement various functions, operations, acts, processes, and/or methods.

FIG. 11 is a block diagram of circuitry 1100 that, in some aspects, may be used to implement various functions, operations, acts, processes, and/or methods disclosed herein. The circuitry 1100 includes one or more processors 1102 (sometimes referred to herein as "processors 1102") operably coupled to one or more data storage devices (sometimes referred to herein as "storage 1104"). The storage 1104 includes machine executable code 1106 stored thereon and the processors 1102 include logic circuitry 1108. The machine executable code 1106 includes information describing functional elements that may be implemented by (e.g., performed by) the logic circuitry 1108. The logic circuitry 1108 is adapted to implement (e.g., perform) the functional elements described by the machine executable code 1106. The circuitry 1100, when executing the functional elements described by the machine executable code 1106, may be considered as specific purpose hardware configured for carrying out functional elements disclosed herein. In some aspects, the processors 1102 may perform the functional elements described by the machine executable code 1106 sequentially, concurrently (e.g., on one or more different hardware platforms), or in one or more parallel process streams.

When implemented by logic circuitry 1108 of the processors 1102, the machine executable code 1106 adapts the processors 1102 to perform operations of aspects disclosed herein. For example, the machine executable code 1106 may adapt the processors 1102 to perform at least a portion or a totality of the capacitive sensing methods of FIGS. 12 and 13. As another example, the machine executable code 1106 may adapt the processors 1102 to perform at least a portion or a totality of the operations discussed for the receiver of FIG. 9. As another example, the machine executable code 1106 may adapt the processors 1102 to perform at least a portion or a totality of the operations discussed for the system of FIG. 10. As a specific, non-limiting example, the machine executable code 1106 may adapt the processors 1102 to perform at least a portion of the capacitive sensing operations discussed herein.

The processors 1102 may include a general purpose processor, a specific purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a specific-purpose computer while the general-purpose computer is configured to execute functional elements corresponding to the machine executable code 1106 (e.g., software code, firmware code, hardware descriptions) related to aspects of the present disclosure. It is noted that a general-purpose processor (may also be referred to herein as a host processor or simply a host) may be a microprocessor, but in the alternative, the processors 1102 may include any conventional processor, controller, microcontroller, or state machine. The processors 1102 may also be implemented as a combination of computing devices, such as a combination of a DSP and a microprocessor, a plurality of microprocessors, one or more microprocessors in conjunction with a DSP core, or any other such configuration.

In some aspects, the storage 1104 includes volatile data storage (e.g., random-access memory (RAM)), non-volatile data storage (e.g., flash memory, a hard disc drive, a solid state drive, erasable programmable read-only memory (EPROM), without limitation). In some aspects, the processors 1102 and the storage 1104 may be implemented into a single device (e.g., a semiconductor device product, a system on chip (SOC), without limitation). In some aspects, the processors 1102 and the storage 1104 may be implemented into separate devices.

In some aspects, the machine executable code 1106 may include computer-readable instructions (e.g., software code, firmware code). By way of non-limiting example, the computer-readable instructions may be stored by the storage 1104, accessed directly by the processors 1102, and executed by the processors 1102 using at least the logic circuitry 1108. Also by way of non-limiting example, the computer-readable instructions may be stored on the storage 1104, transferred to a memory device (not shown) for execution, and executed by the processors 1102 using at least the logic circuitry 1108. Accordingly, in some aspects the logic circuitry 1108 includes electrically configurable logic circuitry 1108.

In some aspects the machine executable code 1106 may describe hardware (e.g., circuitry) to be implemented in the logic circuitry 1108 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System Verilog™ or very large scale integration (VISI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1108 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some aspects, the machine executable code 1106 may include an HDL, an RTL, a GL description, a mask level description, other hardware description, or any combination thereof.

In aspects where the machine executable code 1106 includes a hardware description (at any level of abstraction), a system (not shown, but including the storage 1104) may be configured to implement the hardware description described by the machine executable code 1106. By way of non-limiting example, the processors 1102 may include a programmable logic device (e.g., an FPGA or a PLC) and the logic circuitry 1108 may be electrically controlled to implement circuitry corresponding to the hardware description into the logic circuitry 1108. Also, by way of non-limiting example, the logic circuitry 1108 may include hard-wired logic manufactured by a manufacturing system (not shown, but including the storage 1104) according to the hardware description of the machine executable code 1106.

Regardless of whether the machine executable code 1106 includes computer-readable instructions or a hardware description, the logic circuitry 1108 is adapted to perform the functional elements described by the machine executable code 1106 when implementing the functional elements of the machine executable code 1106. It is noted that although a hardware description may not directly describe functional elements, a hardware description indirectly describes functional elements that the hardware elements described by the hardware description are capable of performing.

Figure 12:
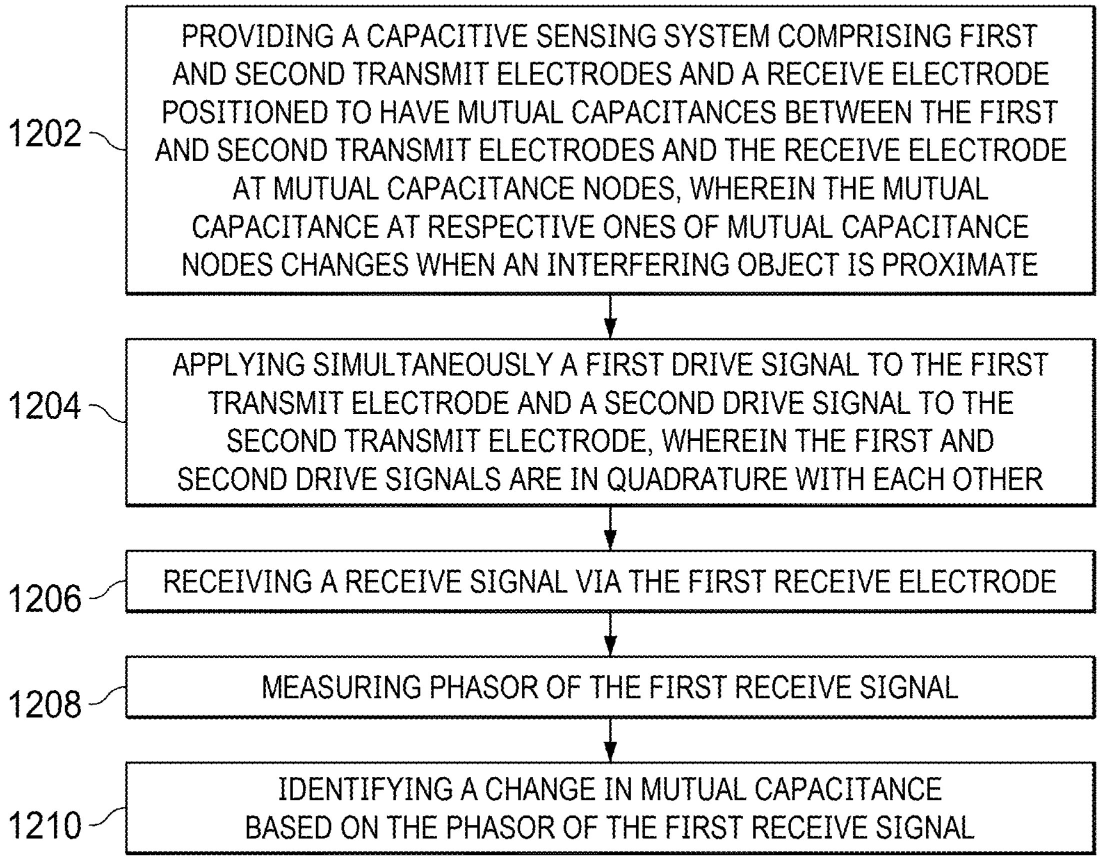
FIG. 12 shows a flow chart of a capacitive sensing method.

FIG. 12 is a flow chart showing a method for capacitive sensing. A capacitive sensing system is provided 1202 comprising first and second transmit electrodes and a receive electrode positioned to have mutual capacitances between the first and second transmit electrodes and the receive electrode at mutual capacitance nodes, wherein the mutual capacitance at respective ones of mutual capacitance nodes changes when an interfering object is proximate; a first drive signal is applied 1204 to the first transmit electrode and simultaneously a second drive signal is applied to the second transmit electrode, wherein the first and second drive signals are in quadrature with each other. A receive signal is received 1206 via the receive electrode. A phasor of the receive signal is measured 1208. A change in mutual capacitance is identified 1210 based on the phasor of the receive signal.

Figure 13:
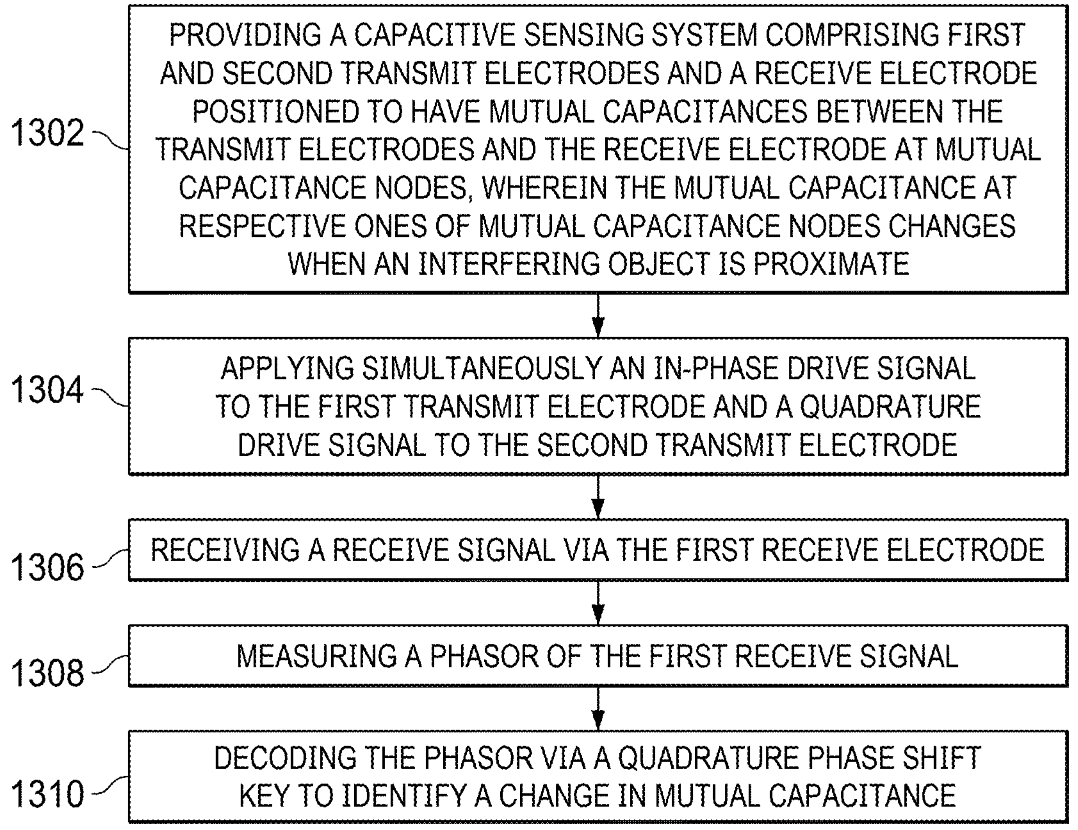
FIG. 13 shows a flow chart of a capacitive sensing method.

FIG. 13 is a flow chart showing a method for capacitive sensing. A capacitive sensing system is provided 1302 comprising first and second transmit electrodes and a receive electrode positioned to have mutual capacitances between the transmit electrodes and the receive electrode at mutual capacitance nodes, wherein the mutual capacitance at respective ones of mutual capacitance nodes changes when an interfering object is proximate. Simultaneously an in-phase drive signal is applied 1304 to the first transmit electrode and a quadrature drive signal is applied 1304 to the second transmit electrode. A receive signal is received 1306 via the receive electrode. A phasor of the receive signal is measured 1308. The phasor is decoded 1310 via a quadrature phase shift key to identify a change in mutual capacitance.

Although examples have been described above, other variations and examples may be made from this disclosure without departing from the spirit and scope of these disclosed examples.

The invention claimed is:

1. A method comprising:

providing a capacitive sensing system comprising first and second transmit electrodes and a receive electrode positioned to have mutual capacitances between the first and second transmit electrodes and the receive electrode at mutual capacitance nodes, wherein the mutual capacitance at respective ones of the mutual capacitance nodes changes when an interfering object is proximate;

applying simultaneously a first drive signal to the first transmit electrode and a second drive signal to the second transmit electrode, wherein the first and second drive signals are in quadrature with each other;

receiving a receive signal via the receive electrode;

measuring a phasor of the receive signal; and identifying a change in mutual capacitance based on the phasor of the receive signal.

2. The method of claim 1, wherein the providing the capacitive sensing system comprises providing third and fourth transmit electrodes, wherein the receive electrode is positioned to have mutual capacitances between the first, second, third, and fourth transmit electrodes at mutual capacitance nodes, wherein the mutual capacitance at respective ones of mutual capacitance nodes changes when an interfering object is proximate;

the method comprising:

applying simultaneously a third drive signal to the third transmit electrode and a fourth drive signal to the fourth transmit electrode, wherein the third and fourth drive signals are in quadrature with each other.

3. The method of claim 2, comprising:

applying during a first chip first, second, third, and fourth drive signals to the first, second, third, and fourth transmit electrodes, respectively, wherein the first and second drive signals are in quadrature with each other, wherein the third and fourth drive signals are in quadrature with each other, wherein the third drive signal has inverse polarity relative to the first drive signal, and wherein the fourth drive signal has inverse polarity relative to the second drive signal;

receiving a first receive signal from the receive electrode corresponding to the first chip;

measuring a first phasor from the first receive signal;

applying during a second chip fifth, sixth, seventh, and eighth drive signals to the first, second, third, and fourth transmit electrodes, respectively, wherein the fifth and sixth drive signals are in quadrature with each other, wherein the seventh and eighth drive signals are in quadrature with each other, wherein the seventh drive signal is in-phase relative to the fifth drive signal, and wherein the eighth drive signal is in-phase relative to the sixth drive signal;

receiving a second receive signal from the receive electrode corresponding to the second chip;

measuring a second phasor from the second receive signal;

performing an operation on the first and second phasors; and identifying a change in a mutual capacitance based on a result of a performed operation on the first and second phasors.

4. The method of claim 3, comprising identifying a mutual capacitance node proximate an interfering object based on a result of a performed operation on the first and second phasors.

5. The method of claim 1, comprising identifying a mutual capacitance node proximate an interfering object based on the phasor of the receive signal.

6. The method of claim 1, wherein the first and second drive signals comprise a wave selected from sinusoidal, square, and impulse.

7. The method of claim 1, wherein the first and second drive signals comprise waves varied over time by a characteristic, wherein the characteristic is selected from amplitude and frequency.

8. A system comprising:

a capacitive sensing system comprising first and second transmit electrodes and a receive electrode positioned to have mutual capacitances between the transmit electrodes and the receive electrode at mutual capacitance nodes, wherein the mutual capacitance at respective ones of mutual capacitance nodes changes when an interfering object is proximate;

a drive signal generator circuit operatively coupled to the first and second transmit electrodes;

a receive signal receiver circuit operatively coupled to the receiver electrode;

a logic circuit operatively coupled to the drive signal generator circuit and the receive signal receiver circuit, the logic circuit to:

apply simultaneously a first drive signal to the first transmit electrode and a second drive signal to the second transmit electrode, wherein the first and second drive signals are in quadrature with each other;

receive a receive signal via the receive electrode;

measure a phasor of the receive signal; and identify a change in mutual capacitance based on the phasor of the receive signal.

9. The system of claim 8, comprising third and fourth transmit electrodes, wherein receive electrode is positioned to have mutual capacitances between the first, second, third, and fourth transmit electrodes at mutual capacitance nodes, wherein the mutual capacitance at respective ones of mutual capacitance nodes changes when an interfering object is proximate;

the logic circuit to:

apply simultaneously a third drive signal to the third transmit electrode and a fourth drive signal to the fourth transmit electrode, wherein the third and fourth drive signals are in quadrature with each other.

10. The system of claim 9, wherein the logic circuit is to:

apply during a first chip first, second, third, and fourth drive signals to the first, second, third, and fourth transmit electrodes, respectively, wherein the first and second drive signals are in quadrature with each other, wherein the third and fourth drive signals are in quadrature with each other, wherein the third drive signal has inverse polarity relative to the first drive signal, and wherein the fourth drive signal has inverse polarity relative to the second drive signal;

receive a first receive signal from the receive electrode corresponding to the first chip;

measure a first phasor from the first receive signal;

apply during a second chip fifth, sixth, seventh, and eighth drive signals to the first, second, third, and fourth transmit electrodes, respectively, wherein the fifth and sixth drive signals are in quadrature with each other, wherein the seventh and eighth drive signals are in quadrature with each other, wherein the seventh drive signal is in-phase relative to the fifth drive signal, and wherein the eighth drive signal is in-phase relative to the sixth drive signal;

receive a second receive signal from the receive electrode corresponding to the second chip;

measure a second phasor from the second receive signal;

perform an operation on the first and second phasors; and identify a change in a mutual capacitance based on a performed operation on the first and second phasors.

11. The system of claim 10, wherein the logic circuit is to identify a mutual capacitance node proximate an interfering object based on a performed operation on the first and second phasors.

12. The system of claim 8, wherein the logic circuit is to identify a mutual capacitance node proximate an interfering object based on the phasor of the receive signal.

13. The system of claim 8, wherein the first and second drive signals comprise a wave selected from sinusoidal, square, and impulse.

14. The system of claim 8, wherein the first and second drive signals comprise waves varied over time by a characteristic, wherein the characteristic is selected from amplitude and frequency.

15. A method comprising:

providing a capacitive sensing system comprising first and second transmit electrodes and a receive electrode positioned to have mutual capacitances between the transmit electrodes and the receive electrode at mutual capacitance nodes, wherein the mutual capacitance at respective ones of mutual capacitance nodes changes when an interfering object is proximate;

applying simultaneously an in-phase drive signal to the first transmit electrode and a quadrature drive signal to the second transmit electrode;

receiving a receive signal via the receive electrode;

measuring a phasor of the receive signal; and decoding the phasor via a quadrature phase shift key to identify a change in mutual capacitance.

16. The method of claim 15, wherein the providing a capacitive sensing system comprises providing third and fourth transmit electrodes, wherein the receive electrode is positioned to have mutual capacitances between the first, second, third, and fourth transmit electrodes at mutual capacitance nodes, wherein the mutual capacitance at respective ones of mutual capacitance nodes changes when an interfering object is proximate;

the method comprising:

applying simultaneously an in-phase drive signal to the first transmit electrode, a quadrature drive signal to the second transmit electrode, an in-phase drive signal to the third transmit electrode, and a quadrature drive signal to the fourth transmit electrode.

17. The method of claim 16, comprising:

applying during a first chip an in-phase drive signal to the first transmit electrode, a quadrature drive signal to the second transmit electrode, an inverse polarity to in-phase drive signal to the third transmit electrode, and an inverse polarity to quadrature drive signal to the fourth transmit electrode;

receiving a first receive signal from the receive electrode corresponding to the first chip;

measuring a first phasor from the first receive signal;

applying during a second chip an in-phase drive signal to the first transmit electrode, a quadrature drive signal to the second transmit electrode, an in-phase drive signal to the third transmit electrode, and a quadrature drive signal to the fourth transmit electrode;

receiving a second receive signal from the receive electrode corresponding to the second chip;

measuring a second phasor from the second receive signal; and decoding the first and second phasors via a code division multiple access operation to identify a change in mutual capacitance.

18. The method of claim 15, comprising identifying a mutual capacitance node proximate an interfering object based on decoding the phasor via a quadrature phase shift key.

19. The method of claim 15, wherein the first and second drive signals comprise a wave selected from sinusoidal, square, and impulse.

20. The method of claim 15, wherein the first and second drive signals comprise waves varied over time by a characteristic, wherein the characteristic is selected from amplitude and frequency.

* * * * *